US012568325B2

(12) United States Patent
Xie et al.

(10) Patent No.: US 12,568,325 B2
(45) Date of Patent: Mar. 3, 2026

(54) COMMUNICATION METHOD APPLIED TO BINAURAL WIRELESS HEADSET, AND APPARATUS

(71) Applicant: Huawei Technologies Co., Ltd., Guangdong (CN)

(72) Inventors: Zichen Xie, Shanghai (CN); Zhan Guo, Shanghai (CN); Weihua Li, Shanghai (CN); Kai Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 352 days.

(21) Appl. No.: 18/161,385

(22) Filed: Jan. 30, 2023

(65) Prior Publication Data

US 2023/0179902 A1 Jun. 8, 2023

Related U.S. Application Data

(63) Continuation of application No. PCT/CN2020/106446, filed on Jul. 31, 2020.

(51) Int. Cl.
H04R 1/10 (2006.01)
H04W 4/80 (2018.01)

(52) U.S. Cl.
CPC ......... H04R 1/1016 (2013.01); H04R 1/1041 (2013.01); H04W 4/80 (2018.02); H04R 2420/07 (2013.01)

(58) Field of Classification Search
CPC ............... H04R 1/1016; H04R 1/1041; H04R 2420/07; H04W 4/80

(Continued)

(56) References Cited

U.S. PATENT DOCUMENTS

2004/0218561 A1* 11/2004 Obuchi ................. H04L 1/1867
370/328
2017/0366924 A1* 12/2017 Thoen ................... H04M 1/724
(Continued)

FOREIGN PATENT DOCUMENTS

CN 110267305 A 9/2019
CN 111447603 A 7/2020

*Primary Examiner* — Vivian C Chin
*Assistant Examiner* — Con P Tran
(74) *Attorney, Agent, or Firm* — WOMBLE BOND DICKINSON (US) LLP

(57) ABSTRACT

This application discloses a communication method applied to a binaural wireless headset, and an apparatus, and relates to the field of chip technologies. The binaural wireless headset includes a first earpiece and a second earpiece. The first earpiece and the second earpiece separately perform wireless communication with a terminal. The method may include: The first earpiece establishes a communication connection with the second headset. The first earpiece receives first indication information, and determines, based on the first indication information, that there is a reception failure when the second earpiece receives a first data packet from the terminal. When the first earpiece successfully receives the first data packet from the terminal, the first earpiece forwards the first data packet to the second earpiece by using the communication connection. Embodiments of this application are used for data packet forwarding/retransmission between binaural wireless headsets.

16 Claims, 13 Drawing Sheets

(a)

(b)

(58) Field of Classification Search
USPC ............. 381/311, 56, 58, 59, 77, 79, 80, 81;
455/73, 78, 88, 41.1, 41.2, 41.3
See application file for complete search history.

(56) References Cited

U.S. PATENT DOCUMENTS

| | | |
|---|---|---|
| 2019/0052961 A1 | 2/2019 | Yun et al. |
| 2019/0230459 A1* | 7/2019 | Sridharan ................ H04K 3/80 |
| 2023/0030553 A1* | 2/2023 | Haartsen ............... H04W 76/19 |

* cited by examiner (a)                   (b)

130

140

COMMUNICATION METHOD APPLIED TO BINAURAL WIRELESS HEADSET, AND APPARATUS

CROSS-REFERENCE TO RELATED APPLICATIONS

This application is a continuation of International Application No. PCT/CN2020/106446, filed on Jul. 31, 2020, the disclosure of which is hereby incorporated by reference in its entirety.

TECHNICAL FIELD

This application relates to the field of chip technologies, and in particular, to a communication method applied to a binaural wireless headset, and an apparatus.

BACKGROUND

Using of a double-earpiece headset based on a Bluetooth technology can implement long-distance communication, that is, there is free space for use, which can greatly improve wearing experience of the double-earpiece headset. However, because wireless communication, for example, Bluetooth, is used between the double-earpiece headset and a mobile phone and between two earpieces of the double-earpiece headset, communication stability between the double-earpiece headset and the mobile phone and communication stability between the two earpieces of the double-earpiece headset are poor. In particular, when the double-earpiece headset is in a wireless-fidelity (Wi-Fi) environment of another user or in an environment in which a plurality of devices cause interference, or in a scenario in which the double-earpiece headset continuously moves, a transmission failure often occurs between the double-earpiece headset and the mobile phone, resulting in discontinuity of transmitted service data and affecting user experience.

With respect to a problem of the transmission failure of the double-earpiece headset, a solution is to add retransmission, that is, a plurality of times of retransmission are performed between the double-earpiece headset and the mobile phone to alleviate the problem. However, retransmission causes higher power consumption and a longer delay. In addition, retransmission still cannot ensure transmission success. To resolve the problems such as the power consumption and the delay that are caused by retransmission performed by the double-earpiece headset, another time-limited or quantity-limited solution is proposed, that is, retransmission is performed within a limited time or within a specified quantity of times, and retransmission is abandoned if retransmission fails within the limited time or retransmission fails after the specified quantity of times. However, abandoning of retransmission still causes a transmission failure, resulting in service discontinuity.

SUMMARY

Embodiments of this application provide a communication method applied to a binaural wireless headset, and an apparatus, so as to improve a transmission success rate of a double-earpiece headset and reduce power consumption of a terminal due to continuous retransmission of the double-earpiece headset.

To achieve the foregoing objective, the following technical solutions are used in embodiments of this application.

According to a first aspect, a communication method applied to a binaural wireless headset is provided. The binaural wireless headset includes a first earpiece and a second earpiece, and the first earpiece and the second earpiece separately perform wireless communication with a terminal. The method includes: The first earpiece establishes a communication connection with the second earpiece; the first earpiece receives first indication information, and determines, based on the first indication information, that there is a reception failure when the second earpiece receives a first data packet from the terminal; and when the first earpiece successfully receives the first data packet from the terminal, the first earpiece forwards the first data packet to the second earpiece by using the communication connection.

In the conventional technology, when there is a data packet that fails to be received by a double-earpiece headset, the terminal retransmits the data packet to the double-earpiece headset for a plurality of times, causing problems of power consumption and a delay. In contrast, in this application, data packet retransmission may be performed between the two earpieces with a relatively stable communication environment. To be specific, when one earpiece fails to receive a data packet, an earpiece that successfully receives the data packet can forward the data packet to the earpiece that fails to receive the data packet. In this way, not only air interface overheads between the headset and the terminal can be reduced, but also a transmission success rate can be improved, and power consumption caused by continuous retransmission from the terminal to the double-earpiece headset is reduced.

In an embodiment, that the first earpiece receives first indication information includes: The first earpiece receives, by using the communication connection, the first indication information sent by the second earpiece, where the first indication information is a first retransmission request, the first retransmission request includes a first sequence number, and the first retransmission request is used to request the first earpiece to forward a first data packet corresponding to the first sequence number. The determining, based on the first indication information, that there is a reception failure when the second earpiece receives a first data packet from the terminal includes: determining, based on the first retransmission request, that there is the reception failure when the second earpiece receives, from the terminal, the first data packet corresponding to the first sequence number.

The first earpiece may be an agreed earpiece that actively initiates a retransmission procedure. When the first earpiece successfully receives the first data packet, the first earpiece may actively inquire the second earpiece whether retransmission is needed, and then the second earpiece sends the first retransmission request to the first earpiece to request to forward the first data packet, so that the data packet is forwarded between the two earpieces, to improve a transmission success rate. Alternatively, the second earpiece may be an agreed earpiece that actively initiates a retransmission procedure. When the second earpiece fails to receive the first data packet, the second earpiece may directly send the first retransmission request to the first earpiece to request to forward the first data packet, so that the data packet is forwarded between the two earpieces, to improve a transmission success rate.

In an embodiment, that the first earpiece forwards the first data packet to the second earpiece by using the communication connection includes: The first earpiece sends a first retransmission response to the second earpiece by using the communication connection, where the first retransmission response includes the first data packet.

3

4

For example, when the first earpiece determines that there is one data packet that fails to be received, the first earpiece sends the first retransmission response to the second earpiece, where the first retransmission response includes the first data packet. Alternatively, when the first earpiece determines that there are a plurality of data packets that fail to be received, the first earpiece sends a plurality of retransmission responses to the second earpiece, and each retransmission response carries one first data packet that fails to be received. That is, when there are a plurality of data packets to be retransmitted for the second earpiece, the first earpiece may send retransmission responses to the second earpiece based on a quantity of the data packets to be forwarded, and each retransmission response carries one data packet to be forwarded.

In an embodiment, the first retransmission response further includes the first sequence number, to indicate that the data packet forwarded by the first earpiece is the first data packet corresponding to the first sequence number.

In an embodiment, before the first earpiece receives, by using the communication connection, the first retransmission request sent by the second earpiece, the method further includes: The first earpiece sends a first synchronization indication to the second earpiece, where the first synchronization indication is used to indicate that all data packets of the first earpiece are successfully received.

In this case, the first earpiece is considered as an earpiece that can initiate a retransmission procedure. When all data packets of the first earpiece in a time period are successfully received, the agreed first earpiece may send NULL to the second earpiece, which indicates that all the data packets of the first earpiece are successfully received. In this way, when the second earpiece fails to receive the data packet, the second earpiece may request the first earpiece to forward the data packet.

In an embodiment, the method further includes: When the first earpiece fails to receive the first data packet from the terminal, the first earpiece sends second indication information to the second earpiece, to indicate that there is a reception failure when the first earpiece receives the first data packet from the terminal.

In an embodiment, before the first earpiece receives first indication information, the method further includes: The first earpiece sends a first NACK to the terminal to indicate that there is a reception failure when the first earpiece receives the first data packet from the terminal; the second earpiece sends a second NACK to the terminal to indicate that there is a reception failure when the second earpiece receives the first data packet from the terminal. After the first earpiece sends second indication information to the second earpiece, the method further includes: The first earpiece receives the first data packet retransmitted by the terminal; and the second earpiece receives the first data packet retransmitted by the terminal.

It may be understood that when the terminal sends the first data packet to the first earpiece, and the first earpiece fails to receive the first data packet, the first earpiece sends the first NACK to the terminal to indicate that the first earpiece fails to receive the first data packet. When the terminal sends the first data packet to the second earpiece, and the second earpiece fails to receive the first data packet, the second earpiece sends the second NACK to the terminal to indicate that the second earpiece fails to receive the first data packet. When both the first earpiece and the second earpiece fail to receive the data packet, the terminal may retransmit the data packet to the two earpieces, or the terminal may not retransmit the data packet that fails to be received by the two earpieces.

In an embodiment, that the first earpiece receives first indication information includes: The first earpiece receives a second data packet sent by the terminal, where the second data packet carries the first indication information, and the second data packet is a data packet sent by the terminal that is next to the first data packet.

That is, when the terminal sends a data packet to each earpiece, the data packet may carry an indication indicating whether the data packet previously sent to one earpiece succeeds. In this way, in at least one last sub-window of one time window, information about whether reception succeeds does not need to be synchronized between the two earpieces, that is, a reception status of the other earpiece does not need to be additionally inquired, and an earpiece that successfully receives the data packet can directly forward, based on the indication, the data packet to the other earpiece that fails to receive the data packet. In this way, an interaction procedure of the double-earpiece headset can be simplified, and a data transmission delay can be reduced.

In an embodiment, the method further includes: When the first earpiece fails to receive the first data packet from the terminal, the first earpiece sends a second synchronization indication to the second earpiece, where the second synchronization indication is used to indicate that the first earpiece fails to receive the first data packet.

That is, in a solution in which the data packet carries information about whether a previous data packet is successfully sent, if the first earpiece determines, based on the received data packet, that a data packet that fails to be received by the second earpiece before also fails to be received by the first earpiece, in a last sub-window of the time window, the first earpiece may send the second synchronization indication to the second earpiece, for example, send a POLL, to indicate that the first earpiece also fails to receive the data packet. For the data packet that fails to be received by both the first earpiece and the second earpiece, the mobile phone may retransmit the data packet to the first earpiece and the second earpiece.

In an embodiment, before the first earpiece forwards the first data packet to the second earpiece by using the communication connection, the method further includes: The first earpiece performs channel coding on the first data packet received from the terminal to obtain a encoded data packet; and that the first earpiece forwards the first data packet to the second earpiece by using the communication connection includes: The first earpiece forwards the encoded data packet to the second earpiece by using the communication connection; and the second earpiece decodes the encoded data packet to obtain the first data packet.

Channel coding can improve reception sensitivity of the data packet, thereby improving a reception success rate. Therefore, when data forwarding is performed between the two earpieces, a raw data packet may be transmitted after secondary channel coding is performed on the raw data packet, to improve a success rate of one-time transmission between the two earpieces, and reduce power consumption and a delay caused by retransmission.

In an embodiment, before the first earpiece performs channel coding on the first data packet received from the terminal, the method further includes: The first earpiece determines that a success rate of forwarding a data packet between the first earpiece and the second earpiece is less than a first preset threshold.

Before forwarding the data packet to the second earpiece, the first earpiece may first determine whether to perform secondary channel coding on the raw data packet, that is, a path through which the first earpiece forwards the data packet to the second earpiece is optional. The first earpiece may determine, based on a success rate of forwarding a data packet between the two earpieces within a period of time, to enable or disable a function of performing secondary channel coding.

In an embodiment, before the first earpiece forwards the first data packet to the second earpiece by using the communication connection, the method further includes: When the first earpiece determines that a sum of a retransmission rate of a data packet between the first earpiece and the terminal and a retransmission rate of a data packet between the second earpiece and the terminal is greater than or equal to a second preset threshold, the first earpiece determines that the data packet can be forwarded between the first earpiece and the second earpiece.

For example, from a perspective of a scenario, for example, a scenario with a high delay requirement, for example, a telephone service or a game, stability and continuity of the service can be ensured if this application is used. Alternatively, from a perspective of a retransmission rate, interaction between the first earpiece and the second earpiece and a reception success rate (or a retransmission rate) between the earpiece and the mobile phone in each time window may be used. When the earpiece that can determine to initiate a retransmission procedure determines that a retransmission rate of the double-earpiece headset reaches a specified threshold, it is determined that link quality between the terminal and the double-earpiece headset is unbalanced. In this case, this application can be used to perform data forwarding/retransmission between the two earpieces.

In an embodiment, that the first earpiece forwards the first data packet to the second earpiece by using the communication connection includes: The first earpiece forwards the first data packet to the second earpiece in a first sub-period of a time period corresponding to receiving the first data packet. When the terminal transmits data packets to the double-earpiece headset, the data packets may be transmitted in a plurality of time periods. In each time period, the terminal may send N data packets to the first earpiece, and also send N data packets to the second earpiece. Then, the two earpieces may be synchronized in last M sub-periods (including a first sub-period) of the time period. The first earpiece may forward the data packet to the second earpiece in a sub-period in which the two earpieces are synchronized, so that the second earpiece obtains, in a timely manner, the data packet forwarded from the first earpiece. M and N are integers greater than 1.

According to a second aspect, a wireless transceiver apparatus is provided, where the wireless transceiver apparatus is applied to a first earpiece in a binaural wireless headset. The wireless transceiver apparatus includes: a transceiver, configured to establish a communication connection with a second earpiece in the binaural wireless headset, where the transceiver is further configured to receive first indication information; and a processor, configured to determine, based on the first indication information, that there is a reception failure when the second earpiece receives a first data packet from a terminal, where the processor is further configured to determine that the first data packet is successfully received from the terminal, and the transceiver is further configured to forward the first data packet to the second earpiece by using the communication connection.

In an embodiment, the transceiver is configured to receive, by using the communication connection, the first indication information sent by the second earpiece, where the first indication information is a first retransmission request, the first retransmission request includes a first sequence number, and the first retransmission request is used to request the first earpiece to forward a first data packet corresponding to the first sequence number; and the processor is configured to determine, based on the first retransmission request, that there is a reception failure when the second earpiece receives, from the terminal, the first data packet corresponding to the first sequence number.

In an embodiment, the transceiver is configured to send a first retransmission response to the second earpiece by using the communication connection, where the first retransmission response includes the first data packet.

In an embodiment, the first retransmission response further includes the first sequence number, to indicate that the data packet forwarded by the first earpiece is the first data packet corresponding to the first sequence number.

In an embodiment, the transceiver is configured to send a first synchronization indication to the second earpiece, where the first synchronization indication is used to indicate that all data packets of the first earpiece are successfully received.

In an embodiment, the processor is configured to determine that reception of the first data packet from the terminal fails; and the transceiver is configured to send second indication information to the second earpiece, to indicate that there is a reception failure when the first earpiece receives the first data packet from the terminal.

In an embodiment, the transceiver is further configured to: send a first NACK to the terminal to indicate that there is a reception failure when the first earpiece receives the first data packet from the terminal; and receive the first data packet retransmitted by the terminal.

In an embodiment, the transceiver is configured to receive a second data packet sent by the terminal, where the second data packet carries the first indication information, and the second data packet is a data packet sent by the terminal that is next to the first data packet.

In an embodiment, the transceiver is further configured to perform channel coding on the first data packet received from the terminal to obtain a encoded data packet; and the transceiver is configured to forward the encoded data packet to the second earpiece by using the communication connection.

In an embodiment, the processor is further configured to determine that a success rate of forwarding a data packet between the first earpiece and the second earpiece is less than a first preset threshold.

In an embodiment, the processor is further configured to: when it is determined that a sum of a retransmission rate of a data packet between the first earpiece and the terminal and a retransmission rate of a data packet between the second earpiece and the terminal is greater than or equal to a second preset threshold, determine that the data packet can be forwarded between the first earpiece and the second earpiece.

According to a third aspect, a communication chip is provided, configured to perform the method according to any one of the first aspect and the possible designs of the first aspect.

According to a fourth aspect, a computer-readable storage medium is provided, including computer instructions. When the computer instructions are run on an electronic device, the electronic device is enabled to perform the method according to any one of the first aspect and the possible designs of the first aspect.

DESCRIPTION OF EMBODIMENTS

The following describes technical solutions in embodiments of this application with reference to the accompanying drawings in embodiments of this application. In the descriptions of embodiments of this application, "I" means "or" unless otherwise specified. For example, AB may represent A or B. In this specification, "and/or" describes only an association relationship between associated objects and indicates that there may be three relationships. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly indicate or implicitly include one or more such features. In the description of this embodiment, unless otherwise stated, "a plurality of" means two or more than two.

Embodiments of this application may be applied to communication between two earpieces and between the double-earpiece headset and a terminal. The communication may be in a wireless communication mode, for example, Bluetooth.

Figure 1:
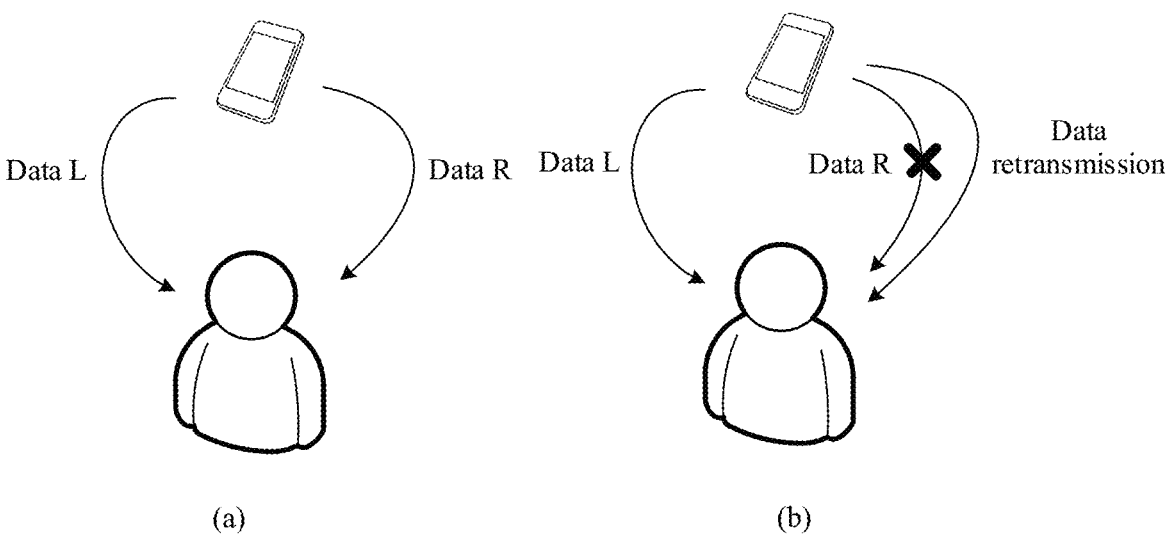
FIG. 1 is a schematic diagram of a transmission success of a double-earpiece headset according to an embodiment of this application.

Compared with a wired communication mode, communication stability of the wireless communication mode is low. When a transmission failure occurs between the double-earpiece headset (a playing device) and the terminal (a sound source device), service continuity is affected. A conventional solution is to add retransmission, which is also the same for the double-earpiece headset. (a) in FIG. 1 shows an example of a transmission success of a double-earpiece headset, that is, a terminal successfully transmits first data (for example, data L) to an earpiece worn on one ear of a user, and also successfully transmits first data (for example, data R) to an earpiece worn on the other ear of the user. (b) in FIG. 1 shows that a terminal successfully transmits first data (for example, data L) to an earpiece worn on one ear of a user, but fails to transmit first data (for example, data R) to an earpiece worn on the other ear, and data retransmission (data retrans) needs to be performed.

A plurality of times of retransmission of the terminal can alleviate this problem to some extent. However, retransmission also means higher power consumption and a longer delay, and retransmission cannot ensure a retransmission success. Details are as follows:

(1) High power consumption: Receiving/Transmitting of a radio frequency module consumes a large amount of power consumption in the headset. If a plurality of times of retransmission are used, a multiple increase in power consumption is caused. In addition, unlike devices with a large-capacity battery such as a mobile phone and a speaker, a volume of the headset is small, a battery capacity is naturally small, and a battery is more sensitive to power consumption. Consequently, the plurality of times of retransmission cause higher power consumption and a battery power to drop rapidly.

(2) Long delay: Time consumed by retransmission is the same as that consumed by transmission. Therefore, the plurality of times of retransmission mean a multiple increase in a delay. In typical application scenarios of the headset such as a phone call or a game, a requirement for a delay is higher than a requirement for a transmission success rate. That is, in these scenarios, a requirement for data timeliness is high, and even if data is successfully retransmitted after a period of time, the successfully retransmitted data loses timeliness.

(3) Low retransmission success rate: Based on an actual measurement, when interference reaches a specific degree, for example, when the headset and/or the mobile phone communicating with the headset are/is within a distance of 3 meters from a Wi-Fi router, a success rate of single retransmission greatly decreases, and even if a plurality of times of retransmission are performed on data, a retransmission success rate is still low.

In the conventional technology, to resolve problems such as retransmission power consumption and a retransmission delay, a solution of quantity-limited retransmission or time-limited retransmission is proposed. However, a data loss caused by abandoning retransmission causes poor user experience of the headset. For example, frame freezing is caused in a music playing scenario of the headset, audio interruption is caused in a phone call scenario of the headset, and an effect is missing in a game scenario of the headset.

Therefore, to resolve the foregoing problems such as power consumption and a delay of the headset, this application provides a design idea: A double-earpiece headset includes two earpieces that are independent of each other. The two earpieces are considered as one "system", and reception is considered successful only when data is successfully received by the two earpieces. In other words, overall reception performance of the "system" is implemented based on a single earpiece with poorer reception performance. In addition, from a perspective of actual experience, a person is far more sensitive to a difference between the two earpieces than a packet loss or mute in the two earpieces. Therefore, user experience can be improved only when data is successfully received by the two earpieces.

If the "system" is decomposed, it is found, through an actual measurement, that reception of the double-earpiece headset is unbalanced due to interference of a human body/signal attenuation, that is, a reception capability of the double-earpiece headset varies in different scenarios.

It is found, through an actual measurement, that when the double-earpiece headset is in the different scenarios, quantities of times of negative acknowledgements (NACK) of a left-ear earpiece and a right-ear earpiece are different, that is, quantities of data packets that fail to be received are different, and correspondingly, packet error rates (PER) are also different. Specifically, when a distance from the mobile phone to the double-earpiece headset is different, if a specified quantity of data packets are transmitted, a PER of the double-earpiece headset varies greatly. For example, in a scenario in which the mobile phone is pulled away from the double-earpiece headset and the left-ear earpiece is close to the mobile phone, especially when the mobile phone is located on an extension line (which needs to pass through the human body in a case of monaural communication) of a connecting line of the double-earpiece headset, a PER of the left-ear earpiece is low, and differs from a PER of the right-ear earpiece by 33%. For another example, when the user sits and wears the double-earpiece headset to listen to music, and the mobile phone is located in a rear pocket on a left ear side, the PER of the left-ear earpiece is low, and differs from the PER of the right-ear earpiece by 16.9%. When the user sits and wears the double-earpiece headset to listen to music, and the mobile phone is located in a front pocket on the left ear side, the PER of the left-ear earpiece is low, and differs from the PER of the right-ear earpiece by 5.7%. When the mobile phone is close to the double-earpiece headset, a box for placing the headset is open, and the headset is not out of the box, the PER of the left-ear earpiece is low, and differs from the PER of the right-ear earpiece by 0.3%.

It can be found that for the "system", a PER of one earpiece is low, a PER of the other earpiece (an earpiece with a high packet error rate) is high, and the PER of the earpiece with the high PER is a PER of the "system". If a PER of a single-earpiece headset with poorer reception performance can be raised to a level of a PER of a single-earpiece headset with better reception performance, a reception success rate of the entire "system" also accordingly increases.

Figure 2:
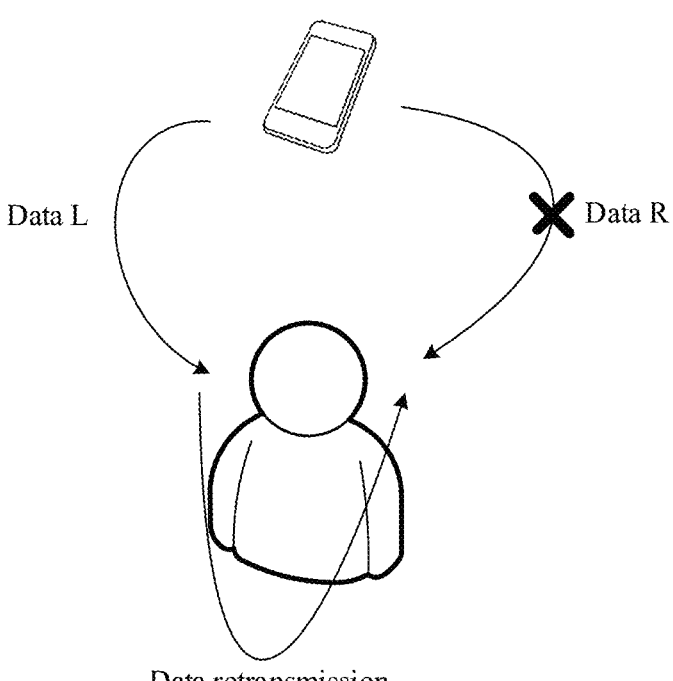
FIG. 2 is a schematic diagram of a transmission failure of a single-earpiece headset in a double-earpiece headset according to an embodiment of this application.

Therefore, in this application, to resolve a problem that the reception capability of the double-earpiece headset in the "system" varies in various scenarios, in consideration of uncertainty of an environment between the mobile phone and the headset (for example, a relative distance between the mobile phone and the headset may change), a communication environment/distance between the two earpieces is relatively fixed, and therefore, a success rate of single transmission between the two earpieces is relatively definite. Therefore, according to the foregoing theory, this application provides a headset communication method. In this method, behavior of a data transmit end (a terminal) may not be changed, and when failing to receive data, one single-earpiece headset at a receive end (a double-earpiece headset) requests data forwarding/retransmission from the other single-earpiece headset. As shown in FIG. 2, a terminal (for example, a mobile phone) successfully sends first data to an earpiece worn on one ear, and the terminal fails to send first data to an earpiece worn on the other ear. The earpiece that successfully receives the first data may forward the first data to the earpiece that fails to receive the first data. In this way, when the double-earpiece headset and/or the terminal are/is in an interfering environment, in comparison with a conventional solution for requesting retransmission from the terminal, forwarding/retransmission may be performed between the two earpieces in this application. Because an environment/distance between the two earpieces is relatively fixed, a transmission success rate of a single-earpiece headset with a weak signal can be improved, and service stability and continuity can be ensured. Alternatively, in this application, whether a previous data packet sent by the terminal is successfully sent may be indicated in each sent data packet. In this way, it may be unnecessary to request forwarding from an earpiece that performs successful reception, and the earpiece that performs successful reception can directly forward the data packet to an earpiece that fails to perform reception, to simplify an interaction procedure of the double-earpiece headset and reduce a delay.

Figure 3:
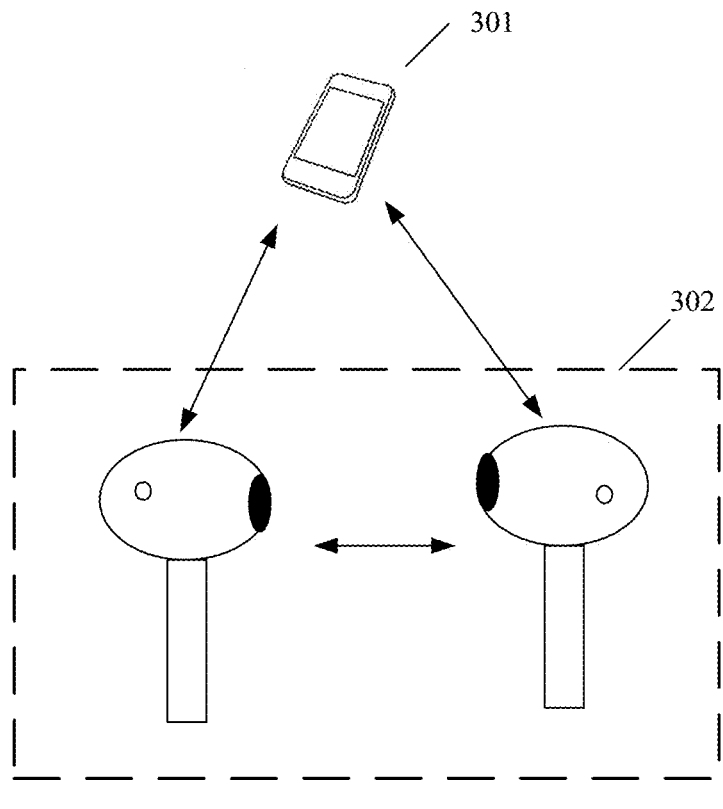
FIG. 3 is a schematic diagram of a network architecture according to an embodiment of this application.

As shown in FIG. 3, a network architecture applied to the headset communication method provided in this application may include a terminal 301 and a double-earpiece headset 302. The terminal may be a mobile phone, a pad, a notebook computer, a personal computer, another audio/video playing device, or the like (only the mobile phone is shown in FIG. 3). The double-earpiece headset 302 may be a binaural true wireless stereo (TWS) headset, another type of double-earpiece headset, or the like. The terminal 301 may perform Bluetooth communication or other wireless communication with the double-earpiece headset 302, and Bluetooth communication or other wireless communication may be performed between two earpieces of the double-earpiece headset 302.

For example, the mobile phone communicates with the binaural TWS headset. In a communication process, a plurality of transmission periods may be included, and each transmission period may be considered as transmission of one event. Each event may include a plurality of subevents, and one event may be understood as one time window (transmission period). Each subevent may be understood as one time sub-window (transmission sub-period), which is briefly referred to as a sub-window in the following description. In each time window, the mobile phone may send one data packet (data) to a single TWS earpiece, and the single TWS earpiece feeds back a response indicating whether reception succeeds to the mobile phone. When reception succeeds, the response may be an acknowledge (ACK) signal, and when reception fails, the response may be a NACK signal. In the last one or more time sub-windows of each time window, one interaction may be performed between the two TWS earpieces to synchronize information about whether data is correctly received.

Figure 4:
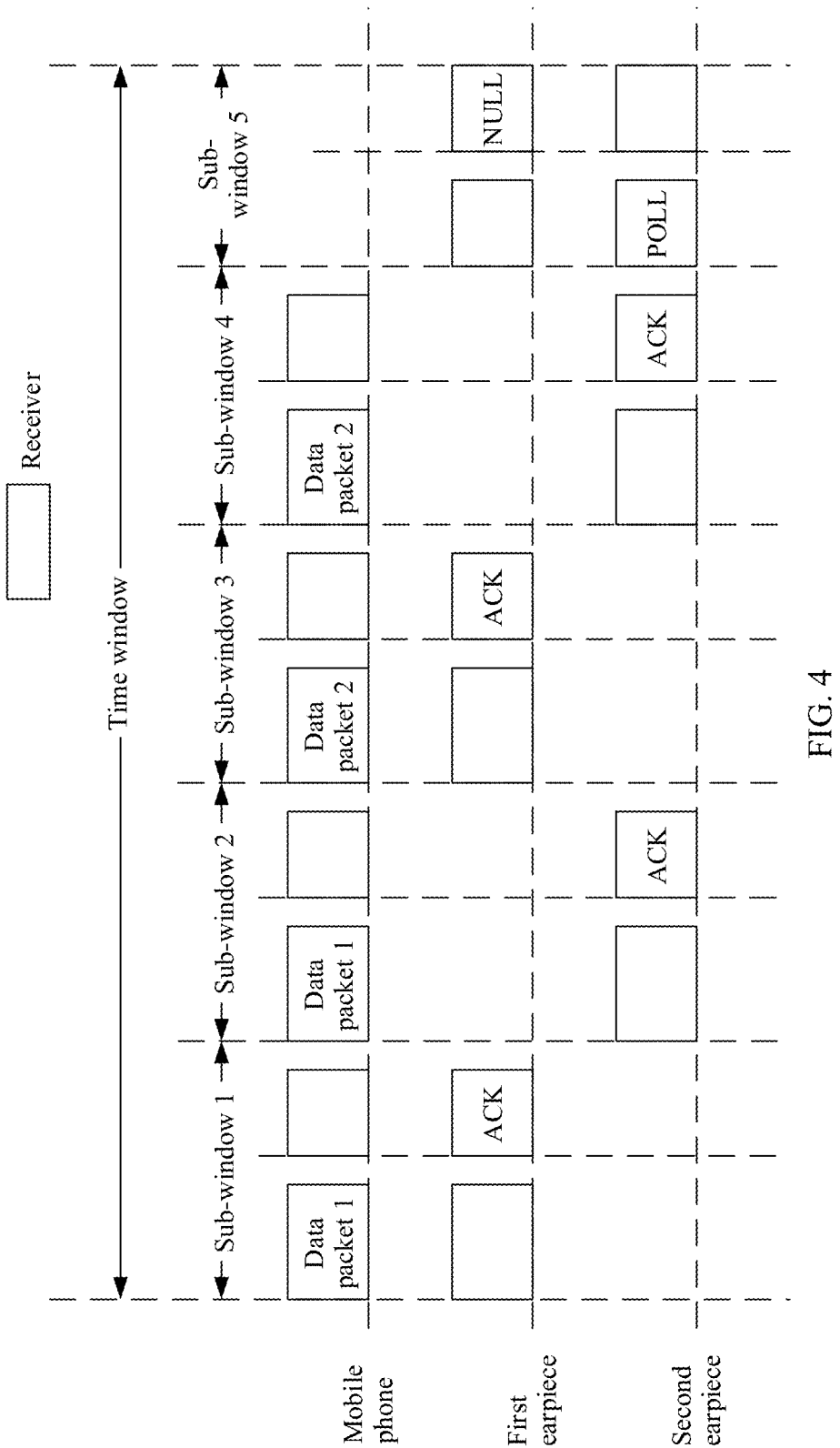
FIG. 4 is a schematic diagram of reception successes of two TWS earpieces in a time window according to an embodiment of this application.

FIG. 4 shows an example of reception successes of two TWS earpieces in a time window. In a process of transmitting data to the double-earpiece headset, the mobile phone may first send a data packet to one earpiece and then send a same or different data packet to the other earpiece. When the same data packet is sent, although the mobile phone sends same data to the two earpieces in a microcosmic time sequence, a person cannot perceive a difference between time of receiving the data by the two earpieces, and considers that the two earpieces simultaneously receive the data, that is, simultaneously play the data. It can be learned from FIG. 4 that, in a sub-window 1 of a time window, the mobile phone sends a data packet 1 to a first earpiece and receives an ACK fed back by the first earpiece; then, in a sub-window 2, the mobile phone sends a data packet 1 to a second earpiece and receives an ACK fed back by the second earpiece; then, in a sub-window 3, the mobile phone sends a data packet 2 to the first earpiece and receives an ACK fed back by the first earpiece; and then in a sub-window 4, the mobile phone sends a data packet 2 to the second earpiece and receives an ACK fed back by the second earpiece. Finally, in a sub-window 5, the second earpiece sends a POLL to the first earpiece to indicate that the second earpiece correctly receives all the data packets, and then the first earpiece feeds back NULL to the second earpiece to indicate that the first earpiece correctly receives all the data packets.

It should be noted that the data packet 1 sent by the mobile phone to the first earpiece and the data packet 1 sent by the mobile phone to the second earpiece may be a same data packet, or may be different data packets. When the first earpiece is an earpiece worn on the left ear, the second earpiece may be an earpiece worn on the right ear. When the first earpiece is an earpiece worn on the right ear, the second earpiece may be an earpiece worn on the left ear.

Figure 5:
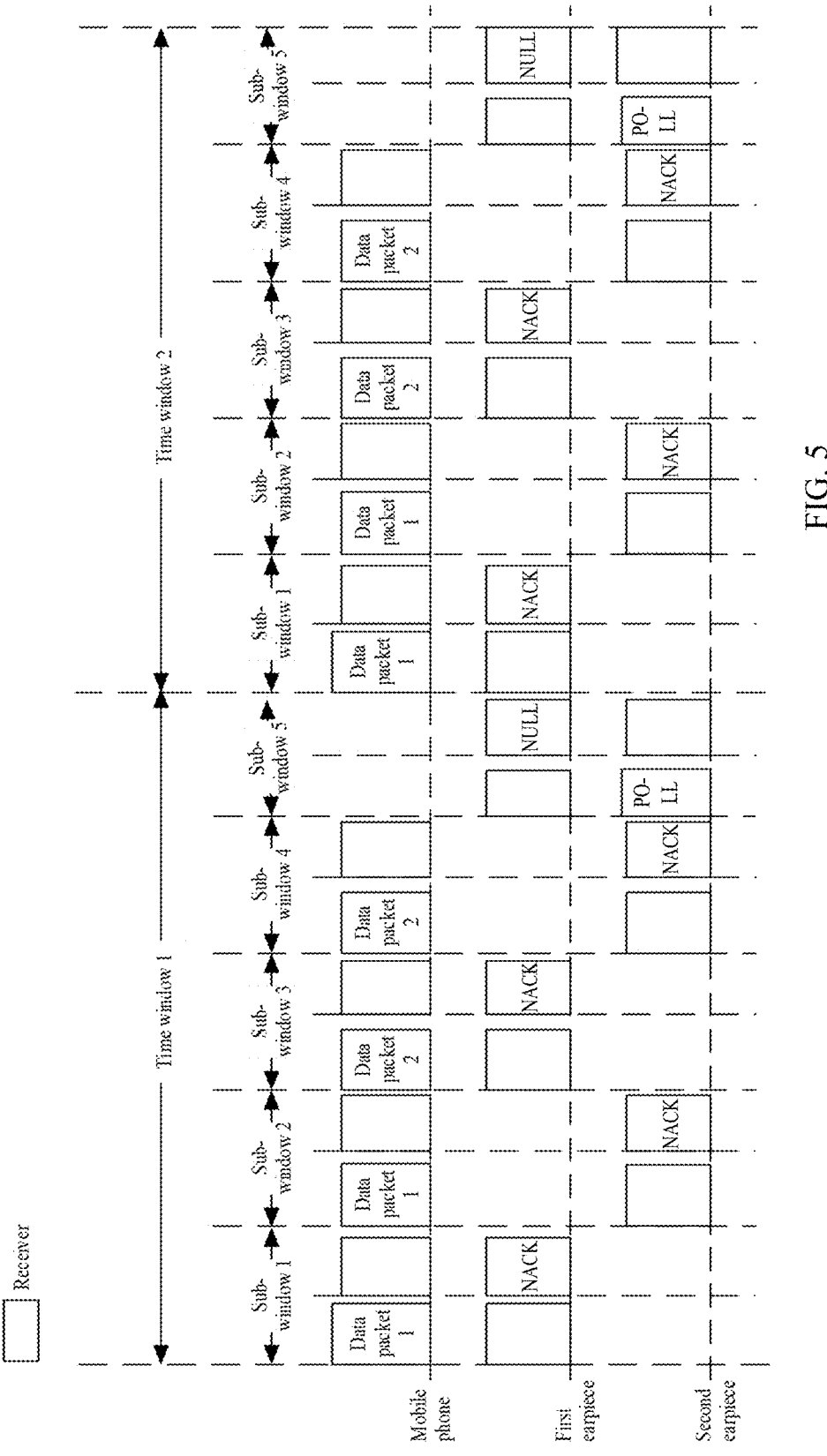
FIG. 5 is a schematic diagram of reception failures of two TWS earpieces in a time window by using a conventional retransmission solution according to an embodiment of this application.

FIG. 5 shows an example of reception failures of two TWS earpieces in a time window by using a conventional retransmission solution. Based on the foregoing description of a data transmission sequence in FIG. 4, in a time window 1 shown in FIG. 5, a first earpiece fails to receive a data packet 1 from the mobile phone in a sub-window 1, a second earpiece also fails to receive a data packet 1 from the mobile phone in a sub-window 2, the first earpiece fails to receive a data packet 2 from the mobile phone in a sub-window 3, and the second earpiece also fails to receive a data packet 2 from the mobile phone in a sub-window 4; and in a sub-window 5, the second earpiece sends a POLL to the first earpiece to indicate that the second earpiece fails to receive all the data packets, and the first earpiece feeds back NULL to the second earpiece to indicate that the first earpiece also fails to receive all the data packets. Then, in a next time window 2, the mobile phone performs retransmission to the first earpiece and the second earpiece, that is, continues to retransmit the data packet 1. In the time window 2 shown in FIG. 5, the mobile phone retransmits the data packet 1 and the data packet 2 to the first earpiece and the second earpiece, but fails. Therefore, in the last sub-window 5 of the time window 2, a POLL sent by the second earpiece to the first earpiece still indicates a failure in receiving the data packet 1 and the data packet 2, and the first earpiece feeds back NULL to the second earpiece to indicate that the first earpiece also fails to receive all the data packets. In other words, in the conventional retransmission solution, the mobile phone may retransmit the data packet to the headset across a plurality of time windows until transmission succeeds or expires.

Unlike the conventional retransmission solution, in this application, when failing to receive a data packet, one earpiece may request forwarding/retransmission from the other earpiece. For an implementation process thereof, refer to descriptions corresponding to a process shown in FIG. 6.

Figure 6:
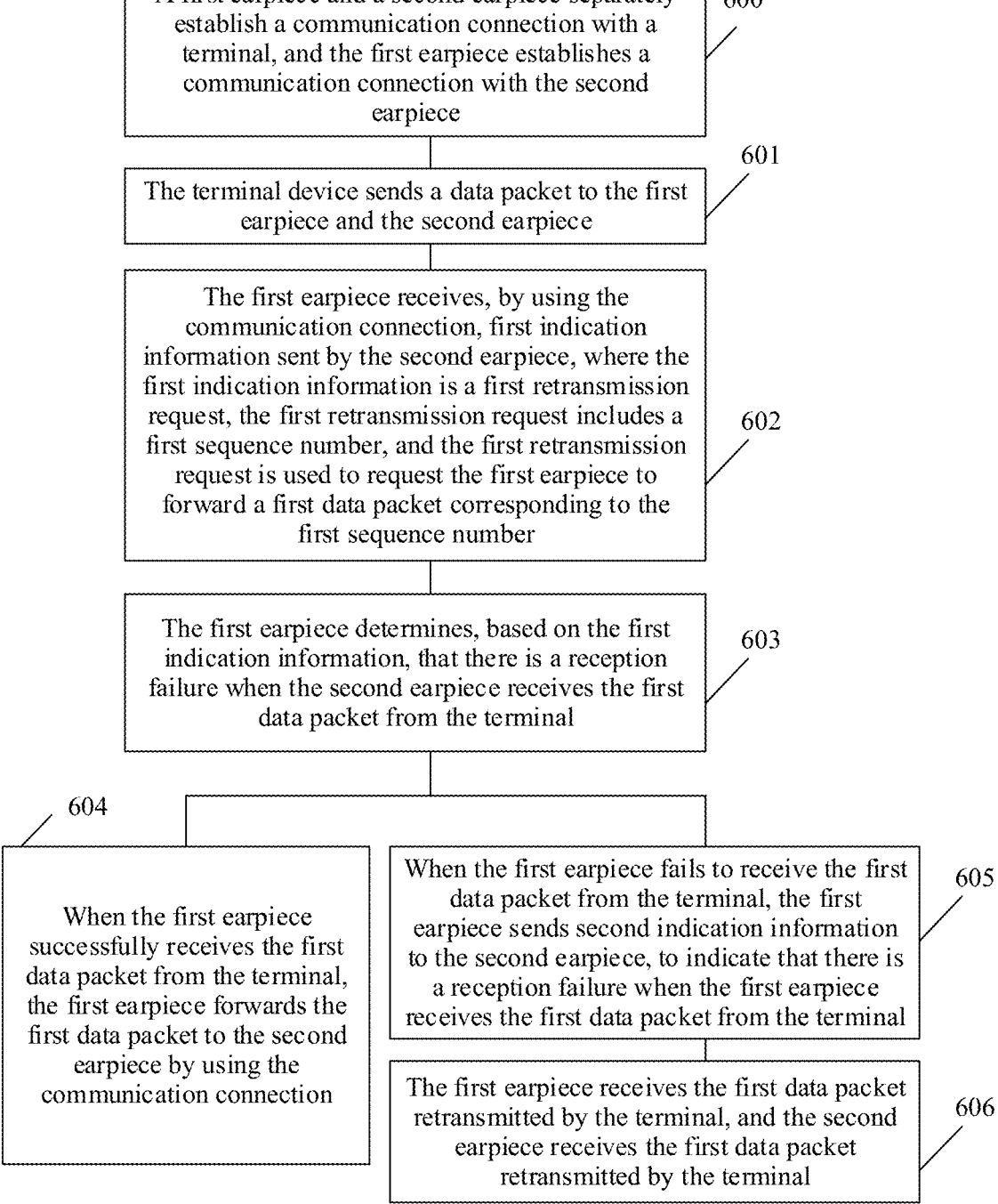
FIG. 6 is a schematic flowchart of a communication method applied to a binaural wireless headset according to an embodiment of this application.

With reference to FIG. 6, an embodiment of this application provides a communication method applied to a binaural wireless headset. The binaural wireless headset includes a first earpiece and a second earpiece. The first earpiece and the second earpiece separately perform wireless communication with a terminal. The method may include the following methods:

600: The first earpiece and the second earpiece separately establish a communication connection with the terminal, and the first earpiece establishes a communication connection with the second earpiece.

For example, when the terminal enables a Bluetooth function, if the first earpiece and the second earpiece are within a Bluetooth communication coverage of the terminal, after the first earpiece and the second earpiece are powered on, Bluetooth pairing may be performed between the first earpiece and the terminal, between the second earpiece and the terminal, and between the first earpiece and the second earpiece, to establish Bluetooth communication connections.

601: The terminal sends a data packet to the first earpiece and the second earpiece.

For example, when the terminal is a mobile phone, based on the transmission sequence shown in FIG. 4, the mobile phone may send the data packet to the first earpiece, and then send the data packet to the second earpiece. For example, in each time window, the mobile phone may send the data packet to the first earpiece in an odd-numbered sub-window, and send the data packet to the second earpiece in an even-numbered sub-window. In one time window, the mobile phone may separately send one or more data packets to the first earpiece and the second earpiece.

602: The first earpiece receives, by using the communication connection, first indication information sent by the second earpiece, where the first indication information is a first retransmission request, the first retransmission request includes a first sequence number, and the first retransmission request is used to request the first earpiece to forward a first data packet corresponding to the first sequence number.

It may also be understood that the first retransmission request indicates the first earpiece to forward the first data packet corresponding to the first sequence number.

It should be noted that the first retransmission request may be a forwarding request that is sent by the second earpiece to the first earpiece for the first time for the data packet, or may be a retransmission request that is sent to the first earpiece for an $N^{th}$ time after the second earpiece requests, for the first time, the first earpiece to forward the data packet but fails, where N is an integer greater than or equal to 2.

In some embodiments, before a data forwarding/retransmission request is sent, an earpiece that can initiate a retransmission procedure may be pre-agreed. In a data transmission process, the earpiece that initiates a retransmission procedure may have a reception failure of a data packet and need to request retransmission from the other earpiece; or may successfully receive the data packet, notify the other earpiece of a success of receiving the data packet, and inquire the other earpiece whether data retransmission needs to be performed.

The agreed earpiece may be an earpiece worn on the left ear of a user or an earpiece worn on the right ear. An agreement on which earpiece is the earpiece that can initiate a retransmission procedure may be specified by the mobile phone in a process of establishing wireless communication between the double-earpiece headset and the mobile phone; or may be set when the double-earpiece headset is delivered from a factory.

Figure 7:
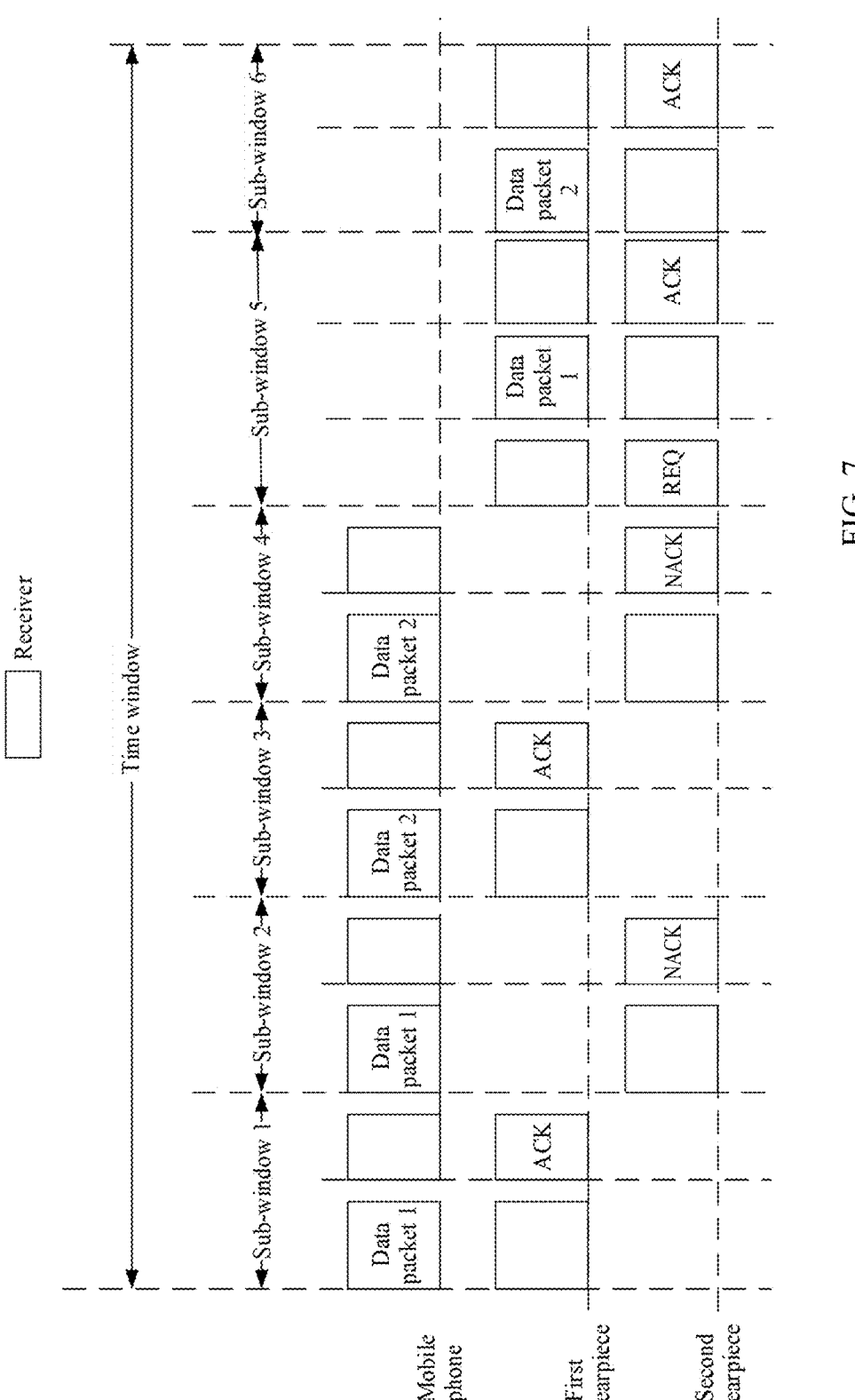
FIG. 7 shows a scenario of requesting retransmission by a second earpiece according to an embodiment of this application when the second earpiece fails to receive a data packet and a first earpiece successfully receives a data packet.
Figure 8:
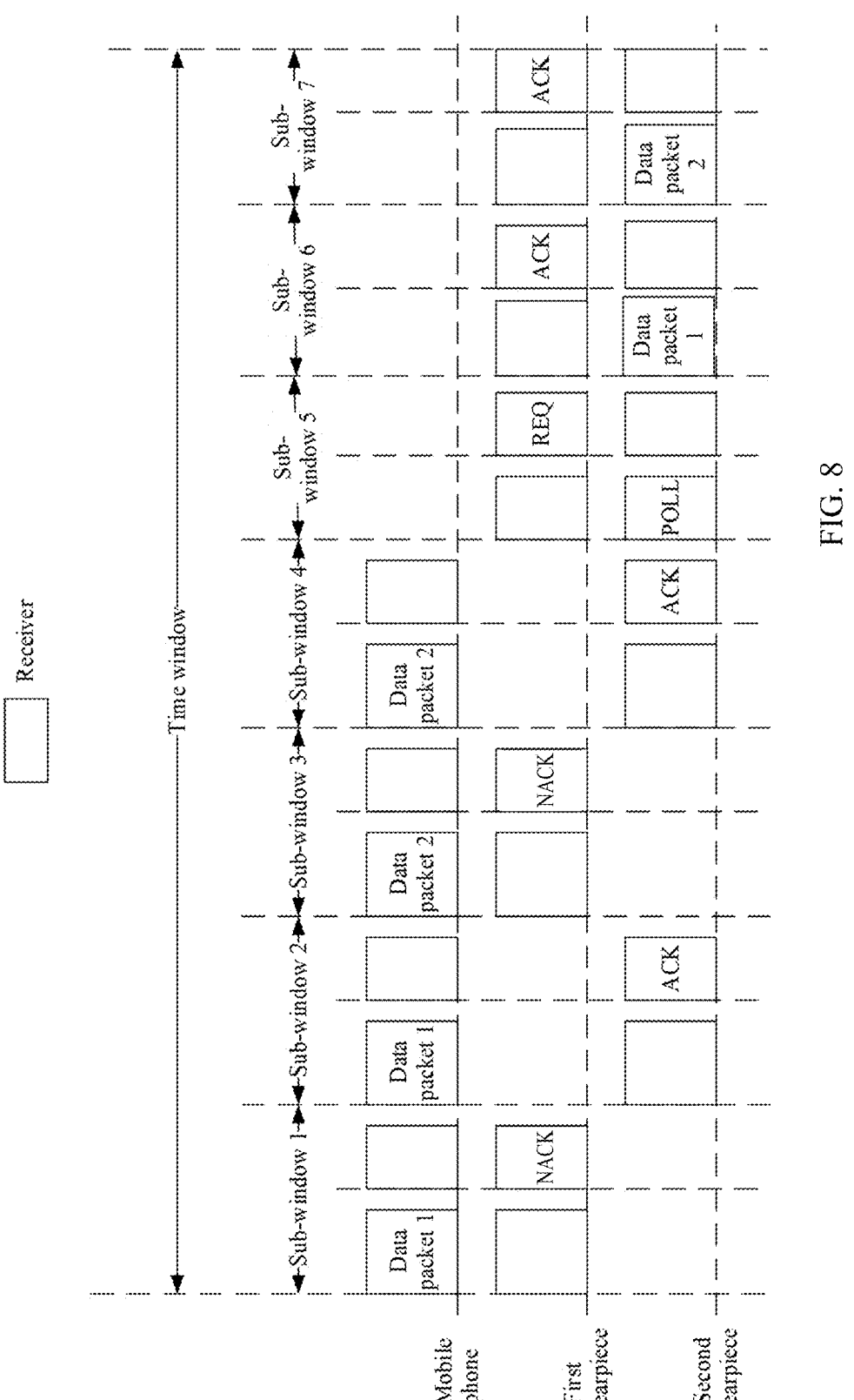
FIG. 8 shows a scenario of requesting retransmission by a first earpiece according to an embodiment of this application when a second earpiece successfully receives a data packet and the first earpiece fails to receive a data packet.

For example, refer to FIG. 7 and FIG. 8. Both second earpieces in FIG. 7 and FIG. 8 are agreed earpieces that can initiate a retransmission procedure. FIG. 7 shows a scenario of requesting retransmission by a second earpiece when the second earpiece fails to receive a data packet and a first earpiece successfully receives a data packet. FIG. 8 shows a scenario of requesting retransmission by a first earpiece when a second earpiece successfully receives a data packet and the first earpiece fails to receive a data packet.

FIG. 7 is used as an example. When sending a data packet 1 to the first earpiece, the mobile phone receives an ACK fed back by the first earpiece, which indicates that the data packet 1 is successfully received. When sending a data packet 1 to the second earpiece, the mobile phone receives a NACK fed back by the second earpiece, which indicates that reception of the data packet 1 fails. When sending a data packet 2 to the first earpiece, the mobile phone receives an ACK fed back by the first earpiece, which indicates that the data packet 2 is successfully received. When sending a data packet 2 to the second earpiece, the mobile phone receives a NACK fed back by the second earpiece, which indicates that reception of the data packet 2 fails. In a sub-window 5 of a time window shown in FIG. 7, the second earpiece is used as the earpiece that initiates a retransmission procedure. Because there is a reception failure when the second earpiece receives a data packet from the terminal, the second earpiece may send the first retransmission request, namely, a REQ shown in FIG. 7, to the first earpiece in the sub-window 5, to request the first earpiece to forward the data packet 1 and the data packet 2.

FIG. 8 is used as an example. When sending a data packet 1 to the first earpiece, the mobile phone receives a NACK fed back by the first earpiece, which indicates that reception of the data packet 1 fails. When sending a data packet 1 to the second earpiece, the mobile phone receives an ACK fed back by the second earpiece, which indicates that the data packet 1 is successfully received. When sending a data packet 2 to the first earpiece, the mobile phone receives a NACK fed back by the first earpiece, which indicates that reception of the data packet 2 fails. When sending a data packet 2 to the second earpiece, the mobile phone receives an ACK fed back by the second earpiece, which indicates that the data packet 2 is successfully received. In a sub-window 5 of a time window shown in FIG. 8, the second earpiece is used as the earpiece that initiates a retransmission procedure. Because the second earpiece successfully receives the data packets, the second earpiece may send a first synchronization indication (POLL) to the first earpiece in the sub-window 5, to indicate that the second earpiece successfully receives the data packets in the current time window. When the first earpiece learns that the second earpiece successfully receives the data packets, because there is a data packet that fails to be received by the first earpiece, method 602 may be replaced with: The first earpiece sends a first retransmission request (the REQ in FIG. 8) to the second earpiece by using the communication connection, where the first retransmission request includes first indication information and a first sequence number, the first indication information indicates that there is a reception failure when the first earpiece receives a first data packet from the terminal, the first sequence number indicates that the second earpiece forwards a first data packet corresponding to the first sequence number, and in the example shown in FIG. 8, the first sequence number may include sequence numbers of the data packet 1 and the data packet 2.

In some embodiments, when the second earpiece sends the first retransmission request to the first earpiece, because the mobile phone may send a plurality of data packets to the double-earpiece headset in one time window between the mobile phone and the double-earpiece headset, and a data packet that fails to be received may be at least one of the plurality of data packets, the first retransmission request may include a sequence number of the at least one data packet that fails to be received by the second earpiece in one time window. For example, a format of a request frame of the first retransmission request may be shown in Table 1.

TABLE 1

| Packet Header | Packet Length | Request No. X | . . . Request No. Y | CRC |
|---|---|---|---|---|

In Table 1, Packet Header indicates a purpose of the request frame, that is, is used to request to forward/retransmit data, or indicates that a requested data packet is used for receiving and sending synchronization; Packet Length indicates a length of the request frame, so that a receive end correctly parses the request frame; Request No. X and Request No. Y indicate that sequence numbers of data packets that request to be forwarded are X and Y in a time window, for example, in the example of FIG. 7, X may be 1, and Y may be 2; and CRC indicates cyclic redundancy check (CRC). Packet Header, Request No. X, . . . , and Request No. Y are equivalent to the first indication information, that is, indicate that there is a reception failure when the second earpiece receives the first data packets with the sequence numbers No. X, . . . , and No. Y from the terminal.

603: The first earpiece determines, based on the first indication information, that there is a reception failure when the second earpiece receives the first data packet from the terminal.

That is, the first earpiece can determine, based on the first retransmission request, that there is a reception failure when the second earpiece receives, from the terminal, the first data packet corresponding to the first sequence number.

Then, method 604 or method 605 is performed.

604: When the first earpiece successfully receives the first data packet from the terminal, the first earpiece forwards the first data packet to the second earpiece by using the communication connection.

In some embodiments, when the first earpiece determines, based on the first indication information, that the second earpiece fails to receive one data packet, for example, the first data packet, the first earpiece sends a first retransmission response to the second earpiece, where the first retransmission response includes the first data packet, and may further include a first sequence number. The first sequence number in the first retransmission response indicates that a data packet to be forwarded by the first earpiece is the first data packet corresponding to the first sequence number.

Alternatively, when the first earpiece determines, based on the first indication information, that the second earpiece fails to receive a plurality of data packets, the first earpiece may send a plurality of retransmission responses to the second earpiece, where each retransmission response carries one first data packet and a first sequence number, and the first data packet and the first sequence number carried in each retransmission response are different from those carried in another retransmission response.

That is, the first earpiece may determine, based on a quantity of data packets that need to be forwarded to the second earpiece, a quantity of retransmission responses to be sent to the second earpiece, where each retransmission response may carry one forwarded data packet.

In some embodiments, one retransmission response is used as an example. A format of a response frame of the first retransmission response may be shown in Table 2.

TABLE 2

| Packet Header | Packet Length | Retrans PKT No. X | Retrans Data | CRC |
|---|---|---|---|---|

In Table 2, Packet Header indicates a purpose of the response frame, and indicates that the forwarded data packet is used for receiving and sending synchronization; Packet Length indicates a length of a response frame; Retrans PKT No. X indicates a sequence number of a data packet carried in the response frame, for example, the first sequence number; Retrans Data indicates content of the data packet carried in the response frame, for example, may indicate content of the first data packet; and CRC indicates a check code.

The transmission process shown in FIG. 7 is used as an example. When Retrans PKT No. X shown in Table 2 is the data packet 1, Retrans Data indicates content of the data packet 1. When Retrans PKT No. X shown in Table 2 is the data packet 2, Retrans Data indicates content of the data packet 2. In the example corresponding to FIG. 7, the data packet 1 may be forwarded in the sub-window 5, and the data packet 2 may be forwarded in a sub-window 6.

In some embodiments, compared with a data forwarding link between the mobile phone and the double-earpiece headset, a data forwarding link between the two earpieces is more stable due to factors such as a communication environment and distance. Therefore, a success rate of one-time transmission between the two earpieces is also higher. However, because communication between the two earpieces is still wireless communication, a specific bit error rate is still caused due to interference factors such as an enhanced Wi-Fi environment. Therefore, to further improve the success rate of one-time transmission between the two earpieces, and reduce power consumption and a delay caused by retransmission, when data forwarding is performed between the two earpieces, a raw data packet may be transmitted after secondary channel coding is performed on the raw data packet. This is because channel coding can improve reception sensitivity of the data packet, thereby improving a reception success rate.

Therefore, in some embodiments, before the first earpiece forwards the first data packet to the second earpiece by using the communication connection, the method may further include: The first earpiece performs channel coding on the first data packet received from the terminal, to obtain a encoded data packet. Based on this, in method 604, that the first earpiece forwards the first data packet to the second earpiece by using the communication connection may include: The first earpiece forwards the first data packet to the second earpiece by using the communication connection; and the second earpiece decodes the encoded data packet to obtain the first data packet.

For example, before forwarding the first data packet to the second earpiece, the first earpiece may first determine whether to perform secondary channel coding on the first data packet, that is, a path through which the first earpiece forwards the data packet to the second earpiece is optional. For example, before the first earpiece performs channel coding on the first data packet received from the terminal, the method may further include: The first earpiece determines that a success rate of forwarding a data packet between the first earpiece and the second earpiece is less than a first preset threshold. That is, the first earpiece may determine, based on a success rate of forwarding a data packet between the two earpieces within a period of time, to enable or disable a function of performing secondary channel coding.

Figure 9:
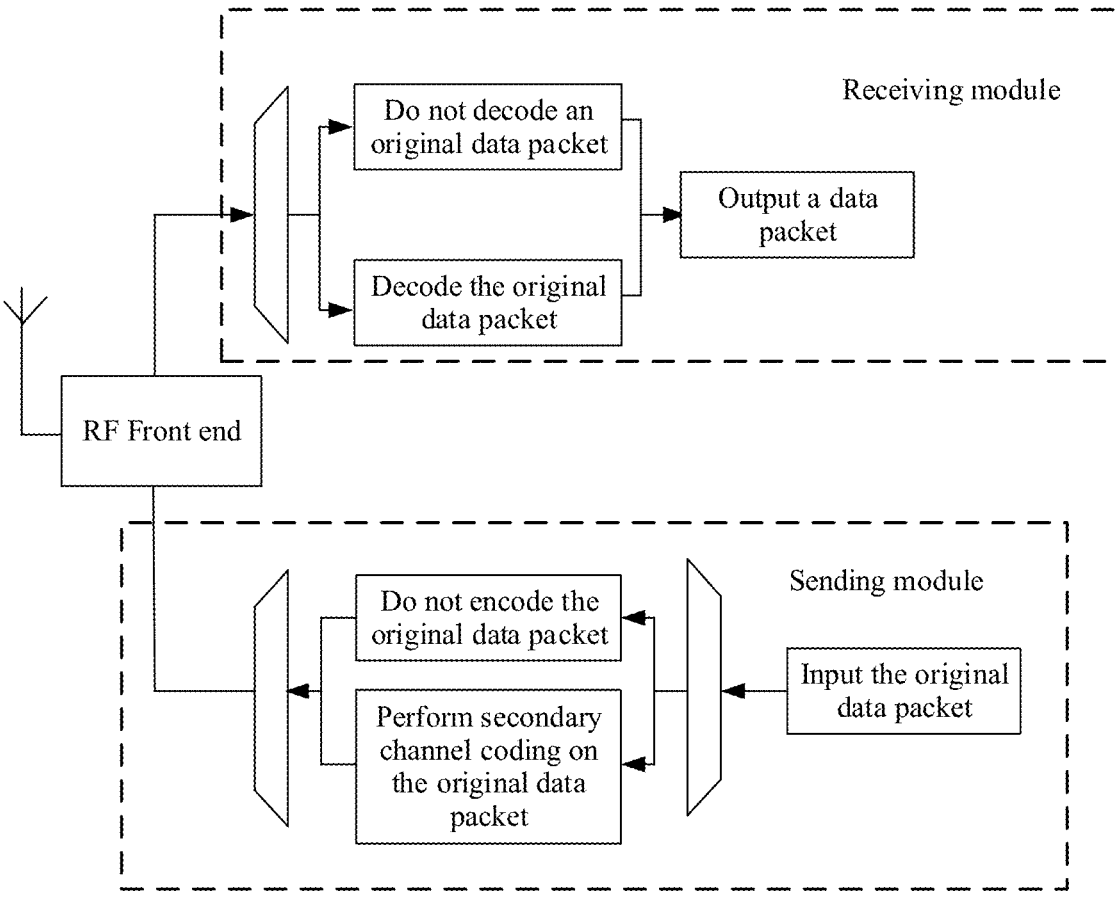
FIG. 9 is a schematic diagram of performing secondary channel coding on a data packet when an earpiece forwards the data packet according to an embodiment of this application.

For example, as shown in FIG. 9, before being configured to determine to forward the raw data packet, a sending module of the first earpiece may determine not to encode the raw data packet or perform secondary channel coding on the raw data packet, and then send, by using a radio frequency (RF) front end, the raw data packet or a data packet obtained after secondary channel coding to the second earpiece. A receiving module of the second earpiece may be configured to receive the raw data packet and perform no decoding, or may be configured to receive the data packet obtained after secondary coding. The second earpiece needs to first decode the data packet obtained after secondary coding, and then output the data packet to a next module for further processing.

It should be noted that, by using the example in FIG. 7 as an example, if the first earpiece fails to forward the data packet to the second earpiece, the second earpiece may further continue to send the first retransmission request to the first earpiece in a subsequent sub-window, and the first earpiece may further continue to retransmit the data packet to the second earpiece.

605: When the first earpiece fails to receive the first data packet from the terminal, the first earpiece sends second indication information to the second earpiece, to indicate that there is a reception failure when the first earpiece receives the first data packet from the terminal.

Figure 10:
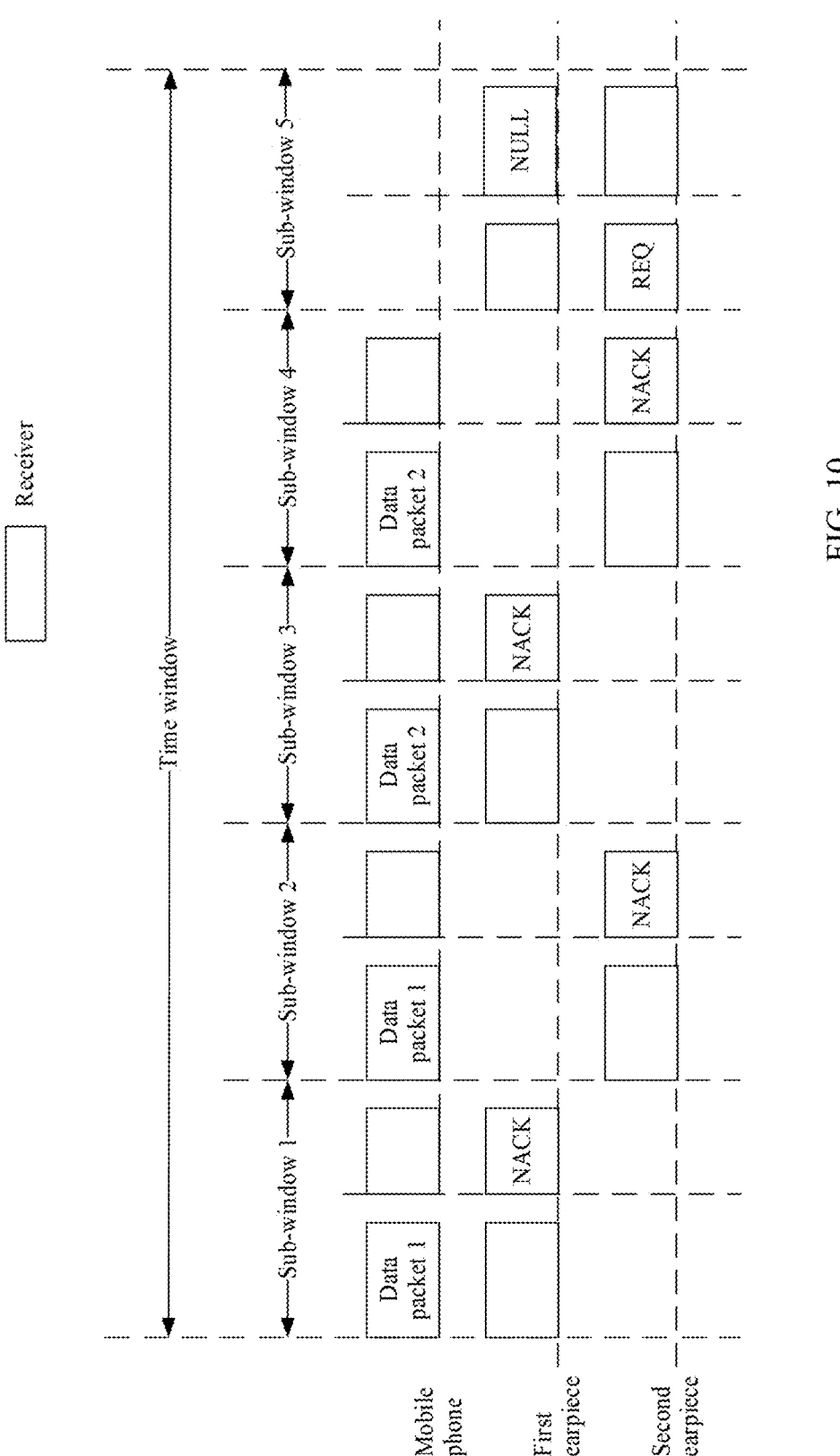
FIG. 10 is a schematic diagram of failing to perform transmission by a mobile phone to both a first earpiece and a second earpiece according to an embodiment of this application.

For example, as shown in FIG. 10, in a time window, the mobile phone fails to send a data packet 1 and a data packet 2 to the first earpiece, and the mobile phone also fails to send a data packet 1 and a data packet 2 to the second earpiece. In a sub-window 5 of the time window, the second earpiece sends first indication information (a REQ) to the first earpiece to request the first earpiece to forward the data packet 1 and the data packet 2. Because the first earpiece also fails to receive the data packet 1 and the data packet 2, the first earpiece sends second indication information (NULL) to the second earpiece, to indicate that the first earpiece also fails to receive the data packet 1 and the data packet 2.

606: The first earpiece receives the first data packet retransmitted by the terminal, and the second earpiece receives the first data packet retransmitted by the terminal.

If both the first earpiece and the second earpiece fail to receive a data packet, the mobile phone may continue to retransmit the data packet to the first earpiece and the second earpiece in a next time window. That is, if the first earpiece sends a first NACK to the terminal to indicate that there is a reception failure when the first earpiece receives the first data packet from the terminal and the second earpiece sends a second NACK to the terminal to indicate that there is a reception failure when the second earpiece receives the first data packet from the terminal, in addition to method 606, the first earpiece and the second earpiece may continue to receive the first data packet retransmitted by the terminal. For example, based on an example in FIG. 10, in a next time window, the mobile phone may continue to send the data packet 1 to the first earpiece, send the data packet 1 to the second earpiece, send the data packet 2 to the first earpiece, and send the data packet 2 to the second earpiece.

It should be noted that when both the first earpiece and the second earpiece fail to receive a data packet, the mobile phone may alternatively choose to abandon retransmitting the data packet to the two earpieces.

In some embodiments, a manner of forwarding/retransmitting a data packet between the two earpieces in this application may be applied to a plurality of scenarios. For example, from a perspective of a scenario, for example, a scenario with a high delay requirement, for example, a telephone service or a game, stability and continuity of the service can be ensured if this application is used. Alternatively, from a perspective of a retransmission rate, interaction between the first earpiece and the second earpiece and a reception success rate (or a retransmission rate) between the earpiece and the mobile phone in each time window may be used. When the earpiece that can determine to initiate a retransmission procedure determines that a retransmission rate of the double-earpiece headset reaches a specified threshold, it is determined that link quality between the terminal and the double-earpiece headset is unbalanced. In this case, this application can be used to perform data forwarding/retransmission between the two earpieces.

Therefore, before the first earpiece forwards the first data packet to the second earpiece by using the communication connection, the method may further include: When the first earpiece determines that a sum of a retransmission rate of a data packet between the first earpiece and the terminal and a retransmission rate of a data packet between the second earpiece and the terminal is greater than or equal to a second preset threshold, the first earpiece determines that the data packet can be forwarded between the first earpiece and the second earpiece. Then, method 602 to method 605 may be performed.

Therefore, data packet forwarding/retransmission is performed between the two earpieces in this application. Because a link between the two earpieces is more stable, compared with a conventional solution, a transmission success rate of a single-earpiece headset with a weak signal can be greatly improved in this application, to ensure service stability and continuity of the double-earpiece headset, for example, improve headset listening experience. According to actual measurement statistics of the conventional solution, even in a common use scenario of the headset, in comparison with one-time retransmission success, in the conventional solution, a plurality of times of retransmission are needed with a probability of at least 50%. However, by using this application, a maximum delay caused by retransmission can be reduced to a stable value, thereby ensuring a synchronous playing function of the double-earpiece headset. In addition, a retransmission rate of the terminal can be further reduced, air interface occupation and power consumption of the terminal are reduced, coexistence pressure between the terminal and the headset is released, and receive power consumption of continuous retransmission of the double-earpiece headset is also reduced. In addition, this application can be further compatible with an existing Bluetooth standard, optimization is performed only at a headset end, and modification is not needed on a terminal side.

Figure 11:
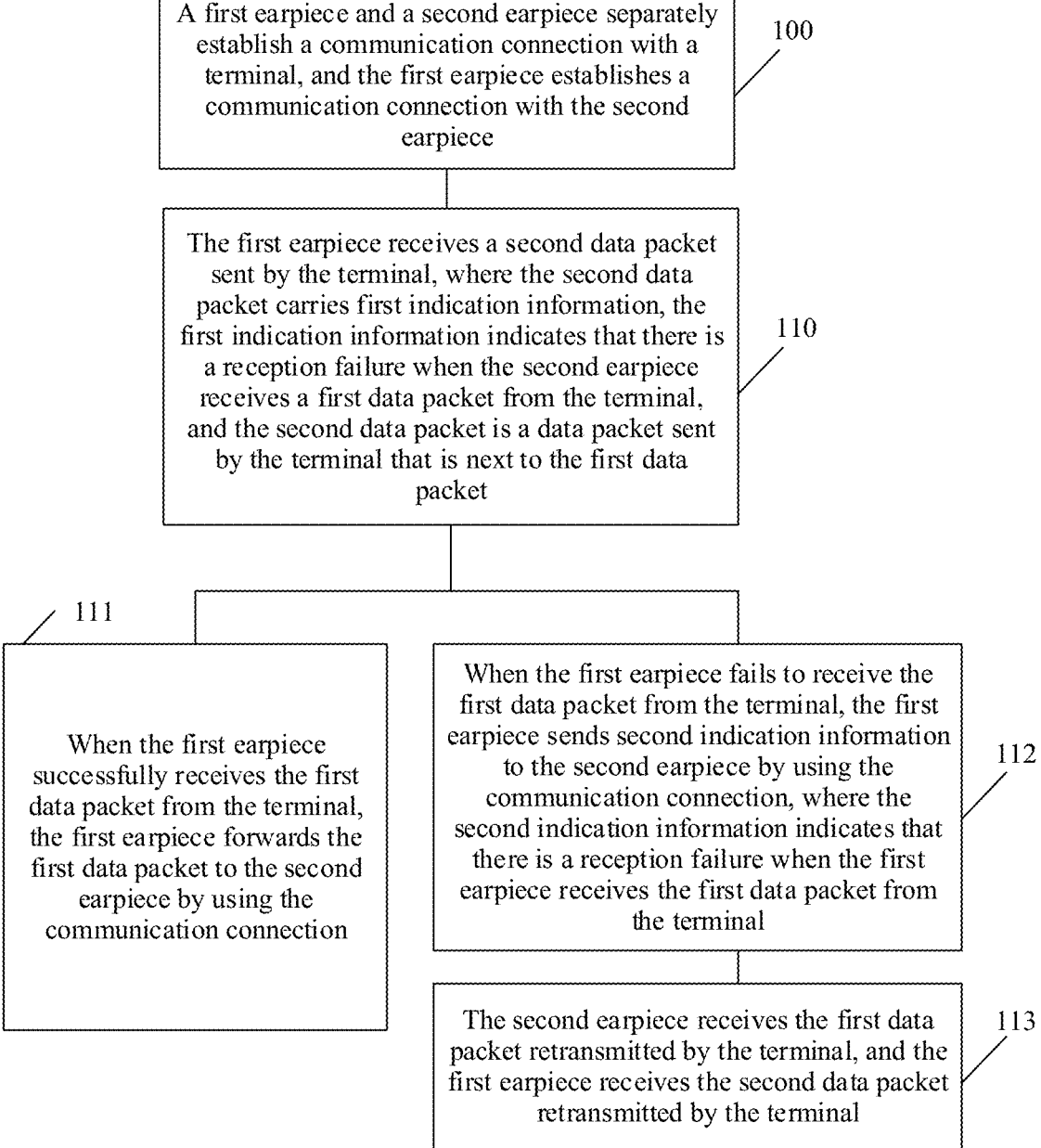
FIG. 11 is a schematic flowchart of a headset communication method according to an embodiment of this application.

An embodiment of this application further provides a communication method applied to a binaural wireless headset. As shown in FIG. 11, the method includes:

100: A first earpiece and a second earpiece separately establish a communication connection with a terminal, and the first earpiece establishes a communication connection with the second earpiece.

For an implementation of method 100, refer to method 600.

110: The first earpiece receives a second data packet sent by the terminal, where the second data packet carries first indication information, where the first indication information indicates that there is a reception failure when the second earpiece receives a first data packet from the terminal, and the second data packet is a data packet sent by the terminal that is next to the first data packet. Then, method 111 or method 112 is performed.

That is, in this embodiment of this application, a data packet sent by the terminal to one earpiece each time may carry an indication indicating whether reception performed by the other earpiece in a previous sub-window is successful. In this way, a reception status of each other can be known between the two earpieces in a timely manner.

In some embodiments, a format of the first data packet may be shown in Table 3.

TABLE 3

| Packet Header | Packet Length | Last ACK/NACK | Data | CRC |
| --- | --- | --- | --- | --- |

In Table 3, Packet Header indicates a header of the second data packet; Packet Length indicates a length of the second data packet; Last ACK indicates that the terminal successfully sends the first data packet to the second earpiece in a previous sub-window; Last NACK indicates that the terminal fails to send the first data packet to the second earpiece in a previous sub-window, for example, Last NACK may indicate that the second earpiece fails to receive the first data packet; Data indicates content of the second data packet; and CRC is a check code.

Data content of the second data packet can be the same as data content of the first data packet.

111: When the first earpiece successfully receives the first data packet from the terminal, the first earpiece forwards the first data packet to the second earpiece by using the communication connection.

That is, when the first earpiece successfully receives the second data packet from the terminal, because the data content of the second data packet is the same as the data content of the first data packet, it is equivalent to that the first earpiece successfully receives the first data packet from the terminal. Therefore, the first earpiece can forward the first data packet to the second earpiece, and the data content of the first data packet is obtained from the data content of the second data packet.

Figure 12:
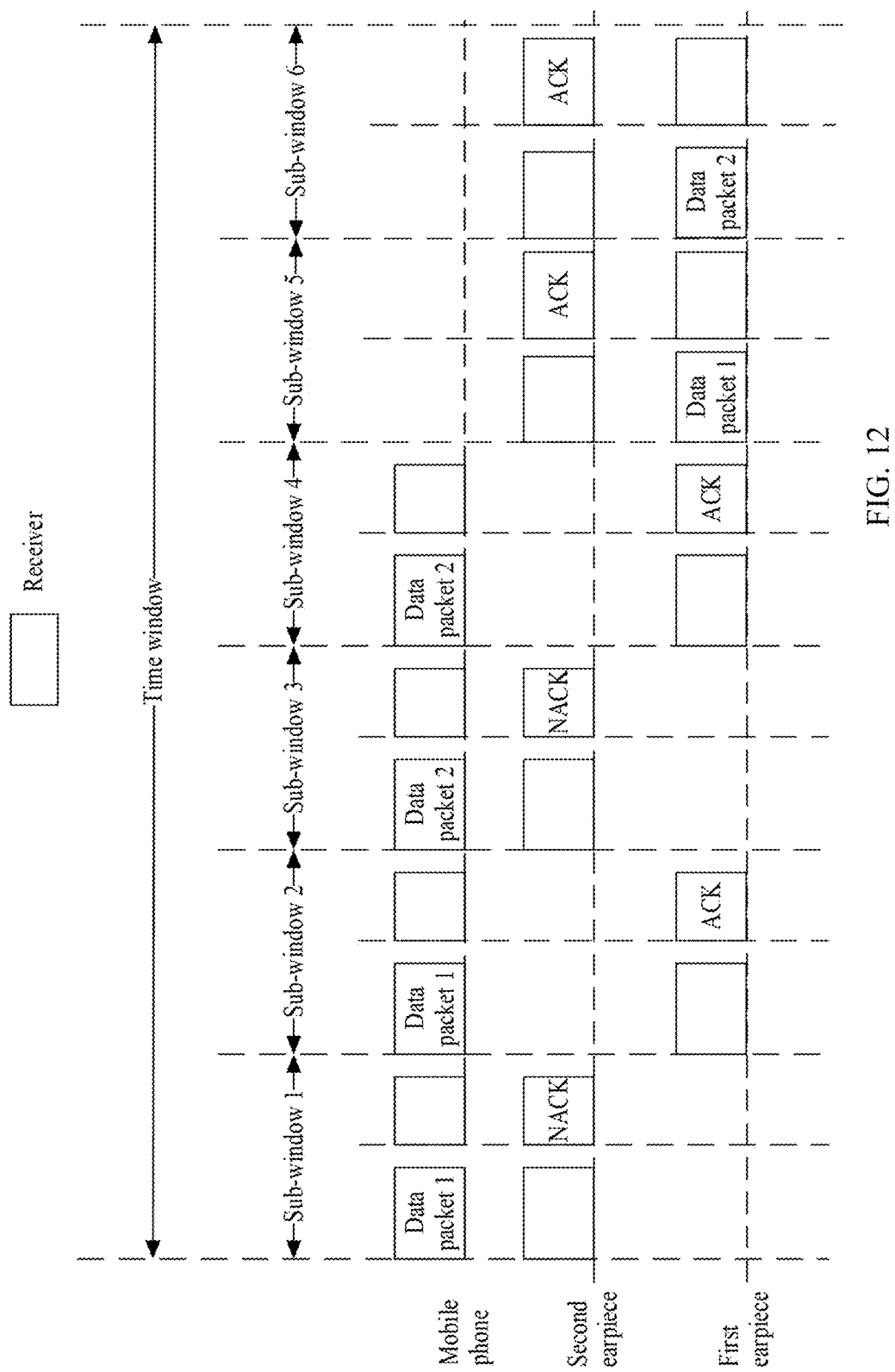
FIG. 12 is a schematic diagram of forwarding a data packet between earpieces in a case of a packet loss of a single-earpiece headset according to an embodiment of this application.

For example, refer to FIG. 12. FIG. 12 shows a case of a packet loss of a single-earpiece headset.

A mobile phone first sends a data packet 1 to the second earpiece in a sub-window 1, and the second earpiece feeds back a NACK to the mobile phone, to indicate that reception of the data packet 1 fails.

The mobile phone continues to send a data packet 1 to the first earpiece in the sub-window 2. In this case, the data packet 1 may carry the first indication information, namely, the field of "Last NACK", indicating that the second earpiece fails to receive the data packet 1 in the previous sub-window (the sub-window 1). If successfully receiving the data packet 1, the first earpiece feeds back an ACK to the mobile phone to indicate that reception of the data packet 1 succeeds.

The mobile phone continues to send a data packet 2 to the second earpiece in a sub-window 3. The data packet 2 may carry second indication information, namely, the field of "Last ACK", indicating that the first earpiece successfully receives the data packet 1 in a previous sub-window (the sub-window 2). If the second earpiece fails to receive the data packet 2, the second earpiece feeds back a NACK to the mobile phone to indicate that the second earpiece fails to receive the data packet 2.

The mobile phone continues to send a data packet 2 to the first earpiece in a sub-window 4. The data packet 2 may carry third indication information, namely, the field of "Last NACK", indicating that the second earpiece fails to receive the data packet 2 in a previous sub-window (the sub-window 3). If the first earpiece successfully receives the data packet 2, the first earpiece feeds back an ACK to the mobile phone to indicate that the first earpiece successfully receives the data packet 2.

In a sub-window 5 of a time window, the first earpiece is an agreed earpiece that can initiate a retransmission procedure. Based on the data packet 1 and the data packet 2 received in the previous sub-windows, it can be known that the second earpiece fails to receive the data packet 1 and the data packet 2. Therefore, the first earpiece can directly forward the data packet 1 to the second earpiece in the sub-window 5, and the second earpiece feeds back an ACK to the first earpiece to indicate that the forwarded data packet 1 is successfully received. Similarly, the first earpiece can continue to forward the data packet 2 to the second earpiece in a sub-window 6, and the second earpiece feeds back an ACK to the first earpiece to indicate that the forwarded data packet 2 is successfully received.

In this way, the first earpiece can directly forward the data packet to the second earpiece instead of inquiring a reception status of the data packet by the second earpiece. In this way, an interaction procedure between the two earpieces can be simplified, and a delay can be reduced.

112: When the first earpiece fails to receive the first data packet from the terminal, the first earpiece sends second indication information to the second earpiece by using the communication connection, where the second indication information indicates that there is a reception failure when the first earpiece receives the first data packet from the terminal.

If the first earpiece determines that a data packet that fails to be received by the second earpiece before the data packet also fails to be received by the first earpiece, in a last sub-window of the time window, the first earpiece may send the second indication information to the second earpiece, for example, send a POLL, to indicate that the first earpiece also fails to receive the data packet.

113: The second earpiece receives the first data packet retransmitted by the terminal, and the first earpiece receives the second data packet retransmitted by the terminal.

For example, for the data packet that fails to be received by both the first earpiece and the second earpiece, the mobile phone may retransmit the data packet to the first earpiece and the second earpiece, or may abandon retransmission.

It should be noted that the implementation of performing secondary channel coding in method 603 is also applicable to the embodiment corresponding to FIG. 12, and the implementation of determining whether to perform data forwarding/retransmission between the two earpieces in step 605 is also applicable to the embodiment corresponding to FIG. 12.

In comparison with a case in which a retransmission request needs to be sent between the two earpieces, or whether a data packet needs to be retransmitted needs to be inquired, in this embodiment, the indication indicating whether the data packet transmitted in the previous sub-window is successfully received by the other earpiece may be carried in the data packet. This can implement that a transmission status of the other earpiece can be exchanged between the two earpieces, so that whether the data packet needs to be forwarded/retransmitted to the other earpiece is directly decided, the interaction procedure between the two earpieces is simplified, and the delay is reduced.

It may be understood that, to implement the foregoing functions, the headset includes a corresponding hardware and/or software module that performs each function. With reference to the example algorithm methods described in the embodiments disclosed in this specification, this application can be implemented in a form of hardware or a combination of hardware and computer software. Whether a function is performed by hardware or hardware driven by computer software depends on particular applications and design constraints of the technical solutions. A person of ordinary skill in the art may use different methods to implement the described functions for each particular application, but it should not be considered that the implementation goes beyond the scope of this application.

In this embodiment, the foregoing headset may be divided into functional modules based on the foregoing method examples. For example, each functional module may be obtained through division for a corresponding function, or two or more functions may be integrated into one processing module. The foregoing integrated module may be implemented in a form of hardware. It should be noted that, in embodiments of this application, division into the modules is an example and is merely logical function division. During actual implementation, another division manner may be used.

Figure 13:
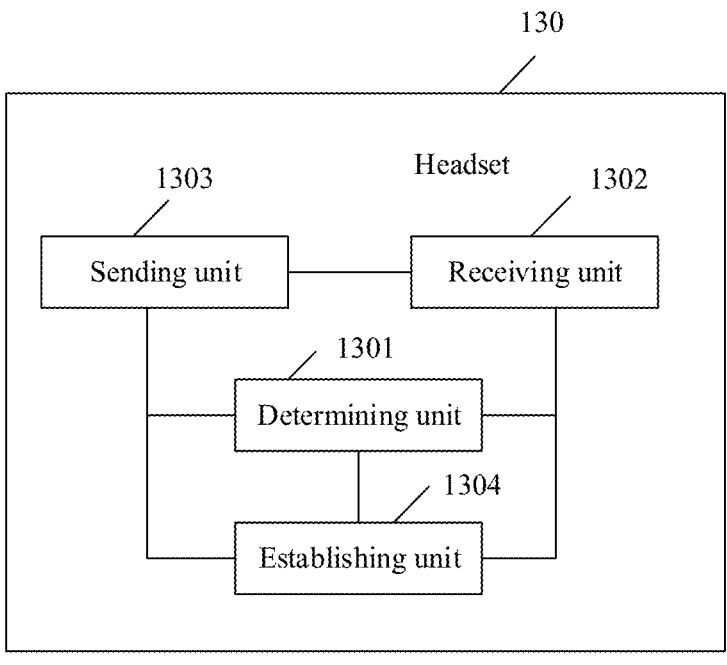
FIG. 13 is a schematic diagram of a structure of a single-earpiece headset according to an embodiment of this application.

In a case in which each functional module is obtained through division for the corresponding function, FIG. 13 is a schematic diagram of possible composition of each headset 130 in the double-earpiece headset in the foregoing embodiments. As shown in FIG. 13, the headset 130 may include a determining unit 1301, a receiving unit 1302, a sending unit 1303, and an establishing unit 1304.

The establishing unit 1304 may be configured to support the headset 130 in performing method 600, method 100, and the like, and/or another process of the technology described in this specification.

The determining unit 1301 may be configured to support the headset 130 in performing method 603, method 604, and the like, and/or another process of the technology described in this specification.

The receiving unit 1302 may be configured to support the headset 130 in performing method 602, method 606, method 113, and the like, and/or another process of the technology described in this specification.

The sending unit 1303 may be configured to support the headset 130 in performing method 604, method 605, method 111, method 112, method 113, and the like, and/or another process of the technology described in this specification.

It should be noted that, all related content of methods in the foregoing method embodiments may be cited in function descriptions of corresponding functional modules. Details are not described herein again.

The headset 130 provided in this embodiment is configured to perform the foregoing headset communication method. Therefore, a same effect as that of the foregoing implementation method can be achieved.

Figure 14:
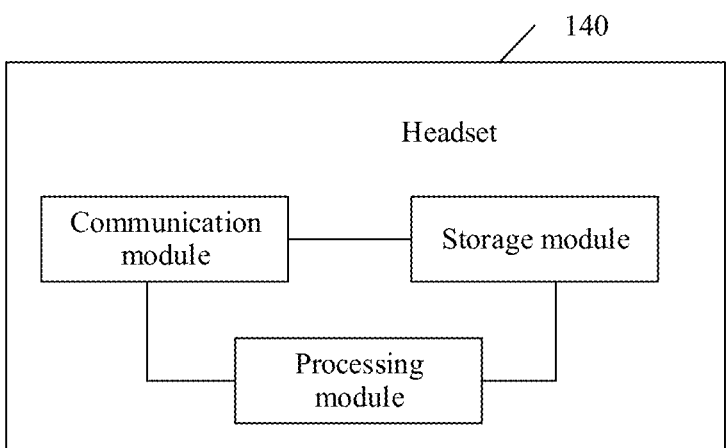
FIG. 14 is a schematic diagram of a structure of a single-earpiece headset according to an embodiment of this application.

When an integrated unit is used, as shown in FIG. 14, a single-earpiece headset 140 may include a processing module, a storage module, and a communication module. The processing module may be configured to control and manage an action of the headset 140, for example, may be configured to support the headset 140 in performing the methods performed by the determining unit 1301 and the establishing unit 1304. The storage module may be configured to store program code, data, and the like in the headset 140. The communication module may be configured to support communication between the headset 140 and another device, for example, communication with another single-earpiece headset or a terminal. The communication module may be configured to support the headset 140 in performing the methods performed by the receiving unit 1302 and the sending unit 1303.

The processing module may be a processor or a controller. The processing module may implement or execute logical blocks, modules, and circuits in various examples described with reference to content disclosed in this application. The processor may be alternatively a combination of processors for implementing a computing function, for example, a combination including one or more microprocessors and a combination of a digital signal processor (DSP) and a microprocessor. The storage module may be a memory. The communication module may be a device that interacts with another electronic device, for example, a radio frequency circuit, a Bluetooth chip, or a Wi-Fi chip.

Figure 15:
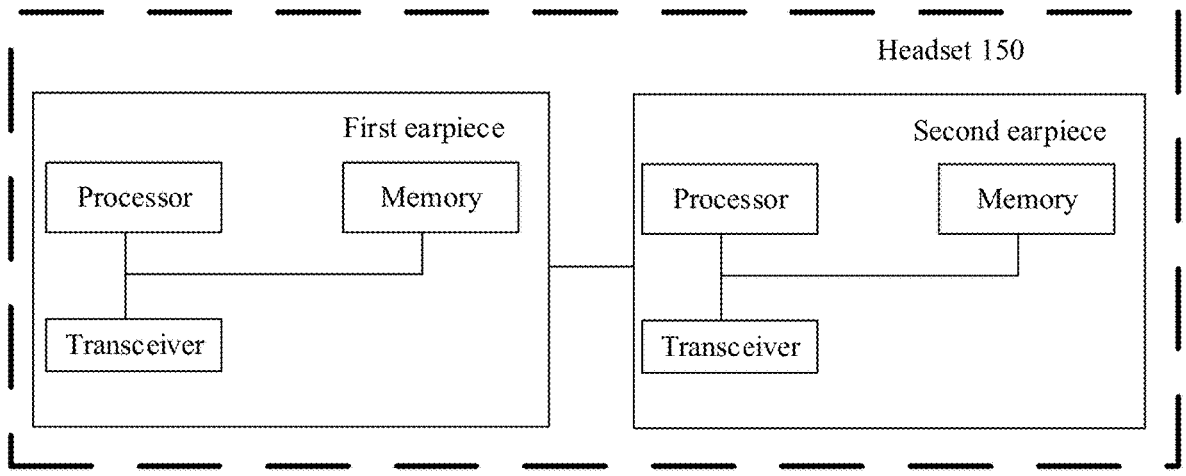
FIG. 15 is a schematic diagram of a structure of a double-earpiece headset according to an embodiment of this application.

In an embodiment, when the processing module is the processor, the storage module is the memory, and the communication module is a transceiver, the double-earpiece headset in this embodiment may be a headset 150 having a structure shown in FIG. 15, including a first earpiece and a second earpiece, and each earpiece includes a processor, a memory, and a transceiver.

Figure 16:
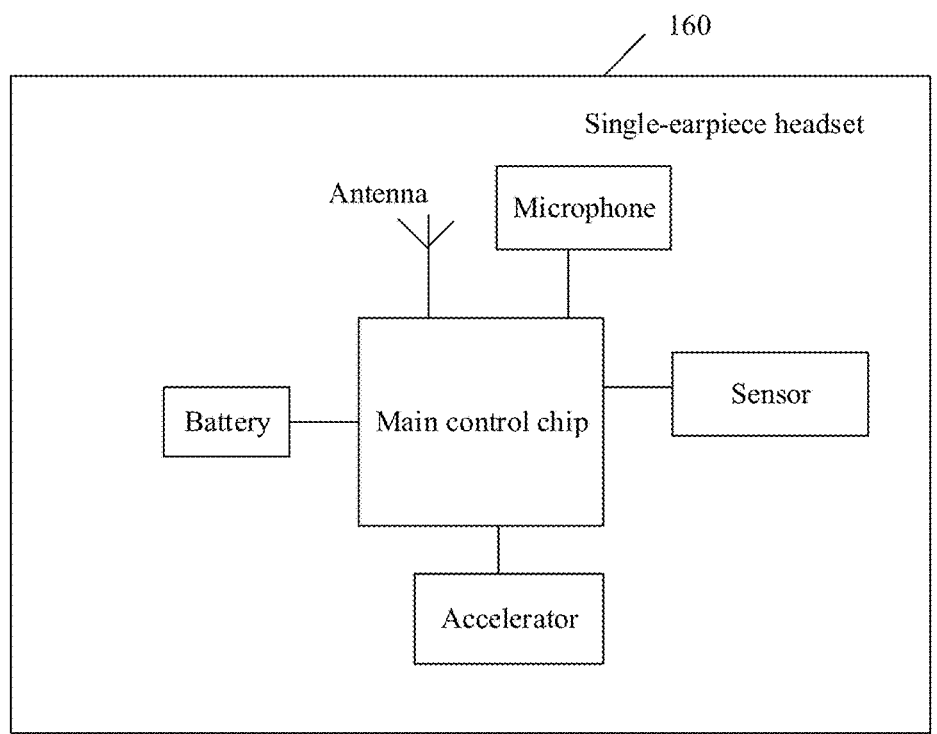
FIG. 16 is a schematic diagram of a structure of a single-earpiece headset according to an embodiment of this application.

An embodiment of this application further provides an architecture of a single-earpiece headset in a double-earpiece headset. As shown in FIG. 16, an architecture of the single-earpiece headset 160 may include a main control chip, and a sensor, an accelerator, a microphone, a battery, an antenna, and the like that are externally connected to the main control chip.

The main control chip may be mainly configured to perform data processing and data preparation. The sensor may be configured to perform a range measurement, voice enhancement, and the like (for example, collect vibration of vocal cords when a user talks, so that generated vibration data can be used to improve voice information collection in a noisy environment). The accelerator may be configured to perform step counting, double-click enabling, wear detection, and the like, and may further perform location determining, system wakeup, and the like. The microphone may be configured to convert a sound signal of the user into an electrical signal. The battery is configured to supply power to a circuit system in the headset. The antenna may be configured to send to-be-sent data of the main control chip to another party, and may further receive data sent by the another party and transmit the data to the main control chip.

In some embodiments, the main control chip may integrate a Bluetooth module, a radio frequency receiver, and a transmitter, and may support a TWS mode to implement a true wireless Bluetooth stereo.

In some embodiments, the main control chip may integrate an audio decoder, to support audio decoding such as MP3 (moving picture experts group audio layer-3) and sub-band coding (SBC) may be supported.

In some embodiments, a read only memory (ROM) and a random access memory (RAM) may be further built in the main control chip, which may largely meet requirements of different Bluetooth application solutions.

In this embodiment of this application, the main control chip may be configured to perform functions of the processor and the transceiver, and may implement or execute various example embodiments described with reference to content disclosed in this application. All related content of the methods in the foregoing method embodiments may be cited in function descriptions of the main control chip, and details are not described herein again.

Based on the foregoing descriptions of the embodiments, a person skilled in the art may understand that for the purpose of convenient and brief description, division into the foregoing functional modules is merely used as an example for illustration. During actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on a plurality of different places. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the methods of the methods described in embodiments of this application. The foregoing storage medium includes any medium that can store program code, such as a USB flash drive, a removable hard disk, a read only memory (ROM), a random access memory (RAM), a magnetic disk, or an optical disc.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method applied to a binaural wireless headset, wherein the method comprises:

establishing, by a first earpiece of the wireless headset, a communication connection with a second earpiece of the wireless headset, wherein the first earpiece and the second earpiece separately perform wireless communication with a terminal;

receiving, by the first earpiece, first indication information, and determining, based on the first indication information, a first reception failure occurs when the second earpiece receives a first data packet from the terminal;

when the first earpiece successfully receives the first data packet from the terminal, forwarding, by the first earpiece, the first data packet to the second earpiece by using the communication connection, wherein before the receiving, by the first earpiece, the first indication information, the method further comprises sending, by the second earpiece, a second negative acknowledgement (NACK) to the terminal, to indicate the first reception failure when the second earpiece receives the first data packet from the terminal;

when the first earpiece fails to receive the first data packet from the terminal, sending, by the first earpiece, second indication information to the second earpiece, to indicate that a second reception failure occurs when the first earpiece receives the first data packet from the terminal, wherein before the receiving, by the first earpiece, the first indication information, the method further comprises: sending, by the first earpiece, a first negative acknowledgement (NACK) to the terminal, to indicate that a third reception failure occurs when the first earpiece receives the first data packet from the terminal;

after the sending, by the first earpiece, the second indication information to the second earpiece, the method further comprises:

receiving, by the first earpiece, the first data packet retransmitted by the terminal; and receiving, by the second earpiece, the first data packet retransmitted by the terminal.

2. The method according to claim 1, wherein the receiving, by the first earpiece, the first indication information comprises:

receiving, by the first earpiece by using the communication connection, the first indication information sent by the second earpiece, wherein the first indication information is a first retransmission request, wherein the first retransmission request comprises a first sequence number, and is used to request the first earpiece to forward the first data packet corresponding to the first sequence number; and wherein the determining, based on the first indication information, that the first reception failure occurs when the second earpiece receives the first data packet from the terminal comprises:

determining, based on the first retransmission request, the first reception failure when the second earpiece receives, from the terminal, the first data packet corresponding to the first sequence number.

3. The method according to claim 2, wherein the forwarding, by the first earpiece, the first data packet to the second earpiece by using the communication connection comprises:

sending, by the first earpiece, a first retransmission response to the second earpiece by using the communication connection, wherein the first retransmission response comprises the first data packet.

4. The method according to claim 3, wherein the first retransmission response further comprises the first sequence number, to indicate that the data packet forwarded by the first earpiece is the first data packet corresponding to the first sequence number.

5. The method according to claim 2, wherein before the receiving, by the first earpiece by using the communication connection, the first retransmission request sent by the second earpiece, the method further comprises:

sending, by the first earpiece, a first synchronization indication to the second earpiece, wherein the first synchronization indication is used to indicate that all data packets of the first earpiece are successfully received.

6. The method according to claim 1, wherein the receiving, by the first earpiece, the first indication information comprises:

receiving, by the first earpiece, a second data packet sent by the terminal, wherein the second data packet carries the first indication information, and the second data packet is a data packet sent by the terminal that is next to the first data packet.

7. The method according to claim 1, wherein before the forwarding, by the first earpiece, the first data packet to the second earpiece by using the communication connection, the method further comprises:

performing, by the first earpiece, channel coding on the first data packet received from the terminal to obtain an encoded data packet; and wherein the forwarding, by the first earpiece, the first data packet to the second earpiece by using the communication connection comprises:

forwarding, by the first earpiece, the encoded data packet to the second earpiece by using the communication connection; and decoding, by the second earpiece, the encoded data packet to obtain the first data packet.

8. The method according to claim 7, wherein before the performing, by the first earpiece, the channel coding on the first data packet received from the terminal, the method further comprises:

determining, by the first earpiece, that a success rate of forwarding a data packet between the first earpiece and the second earpiece is less than a first preset threshold.

9. The method according to claim 1, wherein before the forwarding, by the first earpiece, the first data packet to the second earpiece by using the communication connection, the method further comprises:

when the first earpiece determines that a sum of a retransmission rate of a data packet between the first earpiece and the terminal and a retransmission rate of a data packet between the second earpiece and the terminal is greater than or equal to a second preset threshold, determining, by the first earpiece, that the data packet can be forwarded between the first earpiece and the second earpiece.

10. A wireless transceiver apparatus, applied to a first earpiece in a binaural wireless headset, wherein the wireless transceiver apparatus comprises:

a transceiver, configured to establish a communication connection with a second earpiece in a binaural wireless headset, wherein the transceiver is further configured to receive first indication information; and a processor, configured to determine, based on the first indication information, that a first reception failure occurs when the second earpiece receives a first data packet from a terminal, wherein the processor is further configured to determine whether the first data packet is successfully received from the terminal, wherein the second earpiece sends a negative acknowledgement (NACK) to the terminal to indicate the first reception failure when the second earpiece receives the first data packet from the terminal;

wherein the transceiver is further configured to, when it is determined that the first data packet is successfully received from the terminal, forward the first data packet to the second earpiece by using the communication connection;

wherein the transceiver is further configured to, when it is determined that reception of the first data packet from the terminal fails, send second indication information to the second earpiece, to indicate that a reception failure occurs when the first earpiece receives the first data packet from the terminal;

before receiving the first indication information, send a first negative acknowledgement (NACK) to the terminal, to indicate that a third reception failure occurs when the first earpiece receives the first data packet from the terminal, and after sending the second indication information to the second earpiece, receive the first data packet retransmitted by the terminal, wherein the second earpiece receives the first data packet retransmitted by the terminal.

11. The wireless transceiver apparatus according to claim 10, wherein the transceiver is configured to receive, by using the communication connection, the first indication information sent by the second earpiece, wherein the first indication information is a first retransmission request, wherein the first retransmission request comprises a first sequence number, and is used to request the first earpiece to forward a first data packet corresponding to the first sequence number; and wherein the processor is configured to determine, based on the first retransmission request, a second reception failure occurs when the second earpiece receives, from the terminal, the first data packet corresponding to the first sequence number.

12. The wireless transceiver apparatus according to claim 11, wherein the transceiver is configured to:

send a first retransmission response to the second earpiece by using the communication connection, wherein the first retransmission response comprises the first data packet.

13. The wireless transceiver apparatus according to claim 12, wherein the first retransmission response further comprises the first sequence number, to indicate that the data packet forwarded by the first earpiece is the first data packet corresponding to the first sequence number.

14. The wireless transceiver apparatus according to claim 11, wherein the transceiver is further configured to:

send a first synchronization indication to the second earpiece, wherein the first synchronization indication is used to indicate that all data packets of the first earpiece are successfully received.

15. The wireless transceiver apparatus according to claim 10, wherein the transceiver is configured to receive a second data packet sent by the terminal, wherein the second data packet carries the first indication information, and the second data packet is a data packet sent by the terminal that is next to the first data packet.

16. A non-transitory computer-readable storage medium storing computer instructions, which, when executed by a processor of a first earpiece of a binaural wireless headset, cause the first earpiece to perform operations comprising:

establishing a communication connection with a second earpiece of the binaural wireless headset, wherein the first earpiece and the second earpiece separately perform wireless communication with a terminal;

receiving first indication information, and determining, based on the first indication information, that a first reception failure occurs when the second earpiece receives a first data packet from the terminal; and when the first earpiece successfully receives the first data packet from the terminal, forwarding the first data packet to the second earpiece by using the communication connection, wherein before receiving the first indication information, the second earpiece sends a second negative acknowledgement (NACK) to the terminal, to indicate the first reception failure when the second earpiece receives the first data packet from the terminal;

when the first earpiece fails to receive the first data packet from the terminal, sending second indication information to the second earpiece, to indicate that a second reception failure occurs when the first earpiece receives the first data packet from the terminal, and before receiving the first indication information, sending a first negative acknowledgement NACK) to the terminal, to indicate that a third reception failure occurs when the first earpiece receives the first data packet from the terminal;

after sending the second indication information to the second earpiece, receiving the first data packet retransmitted by the terminal, wherein the second earpiece receives the first data packet retransmitted by the terminal.

* * * * *